US008686981B2

(12) United States Patent
Barnhoefer et al.

(10) Patent No.: US 8,686,981 B2
(45) Date of Patent: Apr. 1, 2014

(54) DISPLAY BRIGHTNESS CONTROL BASED ON AMBIENT LIGHT ANGLES

(75) Inventors: Ulrich T. Barnhoefer, Cupertino, CA (US); Wei Chen, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 589 days.

(21) Appl. No.: 12/895,260

(22) Filed: Sep. 30, 2010

(65) Prior Publication Data

US 2012/0019152 A1 Jan. 26, 2012

Related U.S. Application Data

(60) Provisional application No. 61/367,810, filed on Jul. 26, 2010.

(51) Int. Cl.
*G06F 3/038* (2013.01)
*G06G 5/00* (2006.01)

(52) U.S. Cl.
USPC .......................................... 345/207; 345/204

(58) Field of Classification Search
USPC .......... 315/149–159, 291, 307, 308; 345/102, 345/204, 205, 207, 690–691, 696–697; 250/215, 227.14, 397
See application file for complete search history.

(56) References Cited

U.S. PATENT DOCUMENTS

| | | | | |
|---|---|---|---|---|
| 3,880,528 | A * | 4/1975 | Petersen et al. | 356/225 |
| 5,416,318 | A * | 5/1995 | Hegyi | 250/226 |
| 6,005,249 | A * | 12/1999 | Hayes et al. | 250/372 |
| 6,094,185 | A | 7/2000 | Shirriff | |
| 6,285,344 | B1 | 9/2001 | Everard et al. | |
| 6,292,228 | B1 | 9/2001 | Cho | |
| 6,870,529 | B1 | 3/2005 | Davis | |
| 7,236,154 | B1 * | 6/2007 | Kerr et al. | 345/102 |
| 7,301,545 | B2 | 11/2007 | Park et al. | |
| 7,427,140 | B1 * | 9/2008 | Ma | 359/604 |
| 7,456,829 | B2 | 11/2008 | Fry | |
| 7,465,068 | B2 | 12/2008 | Fornell | |
| 7,468,722 | B2 | 12/2008 | Ferguson | |
| 7,477,228 | B2 | 1/2009 | Wyatt | |
| 7,499,128 | B2 * | 3/2009 | Hu et al. | 349/108 |
| 7,592,583 | B2 * | 9/2009 | Page et al. | 250/216 |
| 7,602,371 | B2 | 10/2009 | Sultenfuss et al. | |
| 7,615,938 | B2 | 11/2009 | Prouse | |
| 7,750,282 | B2 * | 7/2010 | Mahowald et al. | 250/214 AL |

(Continued)

OTHER PUBLICATIONS

U.S. Appl. No. 12/794,623, filed Jun. 4, 2010, Michael Dorjgotov.

*Primary Examiner* — Minh D A
(74) *Attorney, Agent, or Firm* — Fletcher Yoder PC

(57) ABSTRACT

Methods and devices are provided for controlling the brightness of a display for an electronic device based on ambient light conditions. In one embodiment, an electronic device may employ one or more brightness adjustment profiles for changing the brightness of a display based on ambient light levels and/or the angle of incidence of one or more ambient light sources. In certain embodiments, one or more ambient light sensors may be designed to perceive the ambient light level differently based on the angle of incidence of a light source. The perceived ambient light level may then be used to adjust the display brightness based on the one or more brightness adjustment profiles. In other embodiments, one or more ambient light sensors may be designed to detect the angle of incidence of an ambient light source. In these embodiments, the detected angle and the ambient light level may be used to adjust the display brightness.

24 Claims, 19 Drawing Sheets

(56) References Cited

U.S. PATENT DOCUMENTS

| | | | | |
|---|---|---|---|---|
| 8,149,389 | B2 * | 4/2012 | Bohl | 356/4.01 |
| 8,319,764 | B2 * | 11/2012 | Lee et al. | 345/207 |
| 2002/0008696 | A1 | 1/2002 | Wagner | |
| 2004/0012556 | A1 * | 1/2004 | Yong et al. | 345/102 |
| 2004/0217258 | A1 * | 11/2004 | Clugston, Jr. | 250/203.4 |
| 2005/0041139 | A1 | 2/2005 | Lowles | |
| 2005/0128192 | A1 | 6/2005 | Heintzman et al. | |
| 2006/0022934 | A1 | 2/2006 | Whitted et al. | |
| 2007/0091060 | A1 | 4/2007 | Drader et al. | |
| 2008/0088647 | A1 | 4/2008 | Marcu et al. | |
| 2008/0135726 | A1 * | 6/2008 | Balzer et al. | 250/206.1 |
| 2008/0165115 | A1 | 7/2008 | Herz et al. | |
| 2008/0165116 | A1 | 7/2008 | Herz et al. | |
| 2008/0218501 | A1 * | 9/2008 | Diamond | 345/207 |
| 2008/0303806 | A1 * | 12/2008 | Perrin | 345/207 |
| 2009/0002311 | A1 | 1/2009 | Barnhoefer et al. | |
| 2009/0002401 | A1 | 1/2009 | Barnhoefer et al. | |
| 2009/0002560 | A1 | 1/2009 | Barnhoefer et al. | |
| 2009/0002561 | A1 | 1/2009 | Barnhoefer et al. | |
| 2009/0002563 | A1 | 1/2009 | Barnhoefer et al. | |
| 2009/0002564 | A1 | 1/2009 | Barnhoefer et al. | |
| 2009/0002565 | A1 | 1/2009 | Barnhoefer et al. | |
| 2009/0085922 | A1 | 4/2009 | Harris et al. | |
| 2009/0091560 | A1 | 4/2009 | Ferguson | |
| 2009/0140971 | A1 | 6/2009 | Hernandez et al. | |
| 2009/0262128 | A1 * | 10/2009 | Gettemy | 345/589 |
| 2010/0007638 | A1 | 1/2010 | Knowles | |
| 2010/0053222 | A1 | 3/2010 | Kerofsky | |
| 2010/0060667 | A1 | 3/2010 | Chen et al. | |
| 2010/0165660 | A1 | 7/2010 | Weber et al. | |
| 2010/0225640 | A1 | 9/2010 | Vieri et al. | |
| 2011/0267324 | A1 * | 11/2011 | Stephens | 345/207 |

* cited by examiner

DISPLAY BRIGHTNESS CONTROL BASED ON AMBIENT LIGHT ANGLES

CROSS-REFERENCE TO RELATED APPLICATIONS

This application claims the benefit of Provisional Application Ser. No. 61/367,810, filed Jul. 26, 2010, entitled "DISPLAY BRIGHTNESS CONTROL BASED ON AMBIENT LIGHT CONDITIONS," which is incorporated by reference herein in its entirety.

BACKGROUND

The present disclosure relates generally to backlights for displays and, more particularly, to brightness control of backlights based on ambient light conditions.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Electronic devices increasingly include display screens as part of the user interface of the device. As may be appreciated, display screens may be employed in a wide array of devices, including desktop computer systems, notebook computers, and handheld computing devices, as well as various consumer products, such as cellular phones and portable media players. Electronic devices also may include backlights that illuminate the display screens. Ambient light may reflect off the surface of display screens and may reduce the display contrast, thereby making it difficult to view the display screens in high ambient light conditions. Accordingly, as ambient light conditions change, the brightness of a backlight also may be changed to provide sufficient contrast between the ambient light and the backlight. However, the amount of contrast desired between the ambient light and the backlight may vary depending on factors such as user preferences and ambient light conditions.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure generally relates to techniques for controlling the brightness of displays based on ambient light conditions. In accordance with one disclosed embodiment, an electronic device may include one or more ambient light sensors that detect ambient light conditions, such as the ambient light level. The electronic device also may include a display controller that adjusts the brightness of a backlight for the display based on the ambient light conditions. The display controller may adjust the brightness using one or more adjustment profiles that define brightness levels corresponding to different ambient light conditions. According to certain embodiments, the slope of the adjustment profiles may be changed in response to receiving a user input that adjusts display brightness. Further, in certain embodiments, the adjustment profiles may contain two or more sections, each corresponding to different ambient light levels. The slope of each section may be modified independently of the other sections to allow different brightness responses to be employed in different ambient light levels. In certain embodiments, the slope and/or offset of a section may be adjusted by the display controller in response to receiving a user input that changes a brightness setting at a certain ambient light level.

The adjustment profiles also may define the rate at which the brightness is adjusted based on the magnitude and/or direction of the change in the ambient light conditions. In certain embodiments, the rate of adjustment may be designed to approximate the physical response of the human vision system. Further, in certain embodiments, noise reduction techniques may be employed by adjusting the response rates based on the magnitude of the change in the ambient light condition and/or based on whether the display is operating at steady state or executing a brightness adjustment.

The electronic device further may be designed to vary brightness levels based on the angle of incidence of one or more ambient light sources. For example, in certain embodiments, the ambient light sensor may be designed to perceive the ambient light level differently based on the angle of incidence of a light source. The perceived ambient light level may then be used to adjust the display brightness based on the one or more brightness adjustment profiles. In other embodiments, the ambient light sensor may be designed to detect the angle of incidence of an ambient light source. In these embodiments, the detected angle and the ambient light level may be used to adjust the display brightness.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
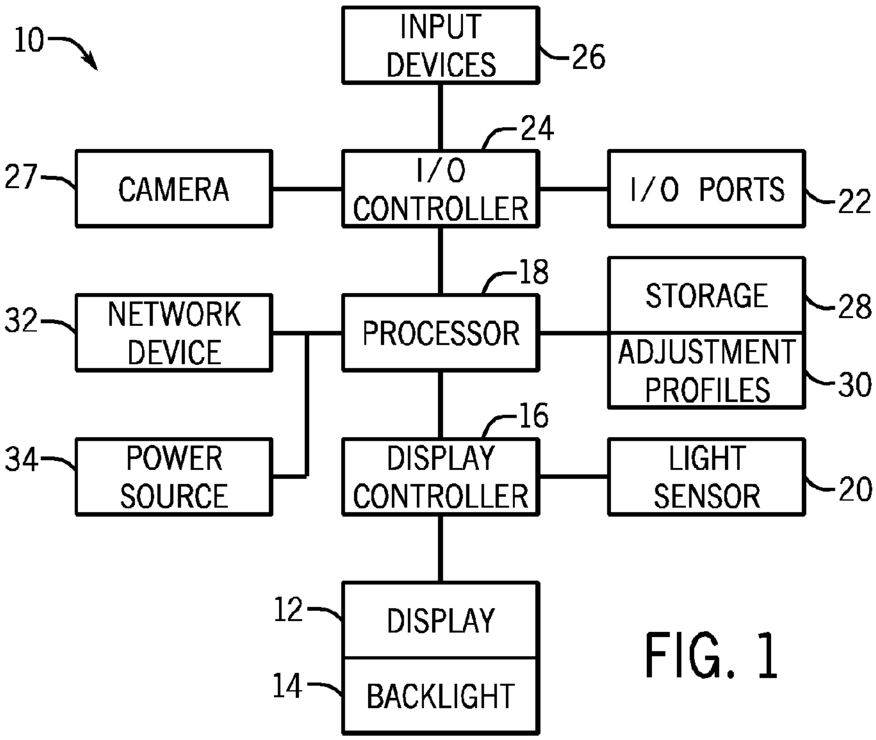
FIG. 1 is a block diagram of exemplary components of an electronic device employing a display, in accordance with aspects of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present disclosure is directed to techniques for controlling the brightness of displays based on ambient light conditions. Electronic devices may include displays that are illuminated by backlights. The electronic devices also may include one or more ambient light sensors that detect ambient light conditions, such as the ambient light level and/or the angle of an ambient light source. As ambient light conditions change, the electronic devices may adjust the brightness of the backlights based on one or more adjustment profiles stored within the electronic devices.

The adjustment profiles may define brightness levels that correspond to different ambient light levels. The slope and/or offset of the adjustment profiles may be modified in response to receiving a user input that adjusts display brightness. According to certain embodiments, an adjustment profile may include two or more sections that each correspond to different ambient light levels. For example, one section may correspond to low ambient light conditions while another section corresponds to high ambient light conditions. The sections may be modified independently of one another to allow different brightness responses to be used in different ambient light conditions. In certain embodiments, the slope and/or offset of a section may be adjusted in response to receiving a user input that changes the brightness setting for a certain ambient light level.

The electronic devices further may be designed to vary brightness levels based on the angle of incidence of one or more ambient light sources. For example, in certain embodiments, the electronic devices may include one or more ambient light sensors designed to perceive the ambient light level based on the angle of incidence of a light source. The perceived ambient light level may then be used to adjust the display brightness based on the one or more brightness adjustment profiles. In other embodiments, one or more ambient light sensors may be designed to detect the angle of incidence of an ambient light source. In these embodiments, the detected angle and the ambient light level may be used to adjust the display brightness.

The adjustment profiles also may define response rates for changing brightness levels based on ambient light conditions. The response rates may vary depending on the magnitude and/or direction of change in the ambient light conditions. In certain embodiments, the response rates may be designed to approximate the physical response of the human vision system. Further, in certain embodiments, noise reduction techniques may be employed by adjusting the response rates based on the magnitude of the change in the ambient light condition and/or based on whether the display is operating at steady state or executing a brightness adjustment.

FIG. 1 is a block diagram of an embodiment of an electronic device 10 that may make use of the brightness control techniques described above. Electronic device 10 may be any type of electronic device that includes a lighted display. For instance, electronic device 10 may be a media player, a mobile phone, a laptop computer, a desktop computer, a tablet computer, a personal data organizer, a workstation, or the like. According to certain embodiments, electronic device 10 may include a desktop or laptop computer, such as a MacBook®, MacBook® Pro, MacBook Air®, iMac®, Mac® Mini, or Mac Pro®, available from Apple Inc. of Cupertino, Calif. In other embodiments, electronic device 10 may be a handheld electronic device, such as a model of an iPad®, iPod® or iPhone® also available from Apple Inc., or electronic device 10 may be a display unit, such as an LED Cinema Display available from Apple Inc. In further embodiments, electronic device 10 may include other models and/or types of electronic devices employing lighted displays.

As shown in FIG. 1, electronic device 10 may include various internal and/or external components that contribute to the function of electronic device 10. The various functional blocks shown in FIG. 1 may include hardware elements (including circuitry), software elements (including computer code stored on a computer-readable medium), or a combination of both hardware and software elements. It should further be noted that FIG. 1 is merely one example of a particular implementation and is intended to illustrate, but not limit, the types of components that may be present in electronic device 10.

Electronic device 10 includes a display 12 that may be used to display image data, which may include stored image data (e.g., picture or video files stored in electronic device 10) and streamed image data (e.g., images received over a network), as well as live captured image data (e.g., photos or video taken using the electronic device 10). Display 12 also may display various images generated by electronic device 10, including a graphical user interface (GUI) for an operating system or other application. Display 12 may be any suitable display such as a liquid crystal display (LCD), a plasma display, an organic light emitting diode (OLED) display, or a cathode ray tube (CRT) display, for example. Additionally, in certain embodiments, display 12 may be provided in conjunction with a touch-sensitive element, such as a touchscreen, that may function as part of a control interface for device 10.

Display 12 includes a backlight 14 that provides light to illuminate display 12. According to certain embodiments, backlight 14 may be a fluorescent light panel or a light emitting diode (LED) array that emits light behind and/or beside an LCD display. In other embodiments, backlight 14 may include any suitable light source, such as a cathode ray tube, a cold cathode fluorescent lamp (CCFL), a metal halide arc lamp, lasers, or neon tubes, among others.

A display controller 16 may provide the infrastructure for receiving data from a processor 18 to show images on display 12. For example, display controller 16 may include control logic for processing display commands from processor 18 to produce text and/or graphics on display 12. Display controller 16 also may include one or more integrated circuits and associated components, such as resistors, potentiometers, voltage regulators, and/or drivers, and may be integrated with display 12 or may exist as a separate component. Further, in other embodiments, display controller 16 may be integrated with processor 18.

Display controller 16 also may control backlight 14 to vary the brightness of display 12. For example, display controller 16 may include control logic for varying the brightness of display 12 based on ambient light conditions. Display controller 16 also may include control logic for modifying adjustment profiles that specify how the brightness should be varied based on ambient light conditions. In certain embodiments, display controller 16 may adjust the voltage or current provided to backlight 14 to adjust the brightness of display 12. For example, display controller 16 may vary a duty cycle of a pulse width modulation (PWM) signal for backlight 14.

Display controller 16 also may adjust the brightness of display 12 based on feedback from one or more light sensors 20. In certain embodiments, display controller 16 may be designed to update the brightness of display 12 at least at 60 times per second. Light sensors 20 may detect ambient light, such as sunlight, fluorescent light, and/or incandescent light, and may provide feedback to display controller 16 that indicates the level of ambient light. Further, light sensors 20 may be designed to detect and/or compensate for the angle of incidence of the ambient light. Light sensors 20 may include one or more optical sensors, such as photodiodes, phototransistors, photoresistors, or combinations thereof, among others, and may be integrated into display 12 or located in close proximity to display 12. Further, in certain embodiments, light sensors 20 may be designed to perceive different colors and/or wavelengths in a manner consistent with that perceived by the human eye. In certain embodiments, light sensors 20 may be designed to detect ambient light levels at least at 20 times per second. According to certain embodiments, the detection rate of at least 20 times per second may be designed to enhance the responsiveness of display 12 to changes in ambient light levels.

Processor 18 may include one or more processors that provide the processing capability to execute the operating system, programs, user and application interfaces, and any other functions of electronic device 10. Processor 18 may include one or more microprocessors and/or related chip sets. For example, processor 18 may include "general purpose" microprocessors, a combination of general and special purpose microprocessors, instruction set processors, graphics processors, video processors, related chips sets, and/or special purpose microprocessors. Processor 18 also may include on board memory for caching purposes.

Electronic device 10 also may include one or more I/O ports 22 designed to connect to a variety of external devices, such as a power source, headset or headphones, or other electronic devices such as computers, printers, projectors, external displays, modems, docking stations, and so forth. I/O ports 22 may support any interface type, such as a universal serial bus (USB) port, a video port, a serial connection port, an IEEE-1394 port, an Ethernet or modem port, an external S-ATA port, a proprietary connection port from Apple Inc., and/or an AC/DC power connection port, among others.

An I/O controller 24 may provide the infrastructure for exchanging data between processor 18 and input/output devices connected through I/O ports 22. I/O controller 24 may contain one or more integrated circuits and may be integrated with processor 18 or may exist as a separate component. I/O controller 24 also may provide the infrastructure for receiving user input and/or feedback through one or more input devices 26 and a camera 27. For instance, input devices 26 may be designed to control one or more functions of electronic device 10, applications running on electronic device 10, and/or any interfaces or devices connected to or used by electronic device 10. Camera 27 may be used to capture images and video, and in certain embodiments, may be used to detect the angle of incidence of one or more ambient light sources.

User interaction with input devices 26, such as to interact with a GUI or application interface displayed on display 12, may generate electrical signals indicative of the user input. These input signals may be routed through I/O controller 24 via suitable pathways, such as an input hub or bus, to processor 22 for further processing. By way of example, input devices 26 may include buttons, sliders, switches, control pads, keys, knobs, scroll wheels, keyboards, mice, touchpads, and so forth, or some combination thereof. In one embodiment, input devices 26 may allow a user to navigate a GUI displayed on display 12 to control settings for adjusting the brightness of display 12.

Information, such as programs and/or instructions, used by processor 18 may be located within storage 28. Storage 28 may store a variety of information and may be used for various purposes. For example, storage 28 may store firmware for electronic device 10 (such as a basic input/output instruction or operating system instructions), various programs, applications, or routines executed on electronic device 10, GUI functions, processor functions, and so forth. According to certain embodiments, storage 28 may store a program enabling control of brightness adjustments for display 12. For example, storage 28 may store instructions and/or control logic that may be used by display controller 16 to modify adjustment profiles for changing the brightness of display 12. Further, storage 28 may store one or more adjustment profiles 30 that may be employed by display controller 16 to vary the brightness of display 12. In addition, storage 28 may be used for buffering or caching during operation of electronic device 10.

Storage 28 may include any suitable manufacture that includes one or more tangible, computer-readable media. For example, storage 28 may include a volatile memory, such as random access memory (RAM), and/or as a non-volatile memory, such as read-only memory (ROM). The components may further include other forms of computer-readable media, such as non-volatile storage for persistent storage of data and/or instructions. The non-volatile storage may include flash memory, a hard drive, or any other optical, magnetic, and/or solid-state storage media. The non-volatile storage may be used to store firmware, data files, software, wireless connection information, and any other suitable data.

Electronic device 10 also may include a network device 32, such as a network controller or a network interface card (NIC), for communicating with external devices. In one embodiment, network device 32 may be a wireless NIC providing wireless connectivity over any 802.11 standard or any other suitable wireless networking standard. Network device 32 may allow electronic device 10 to communicate over a network, such as a Local Area Network (LAN), Wide Area Network (WAN), or the Internet. Further, electronic device 10 may connect to and send or receive data with any device on the network, such as portable electronic devices, personal computers, printers, and so forth. Alternatively, in some embodiments, electronic device 10 may not include network device 32.

Electronic device 10 may be powered by a power source 34 that may include one or more batteries and, or alternatively, an AC power source, such as provided by an electrical outlet. In certain embodiments, electronic device 10 may include an integrated power source that may include one or more batteries, such as a Li-Ion battery. In certain embodiments, a proprietary connection I/O port 22 may be used to connect electronic device 10 to a power source for recharging the battery.

Figure 2:
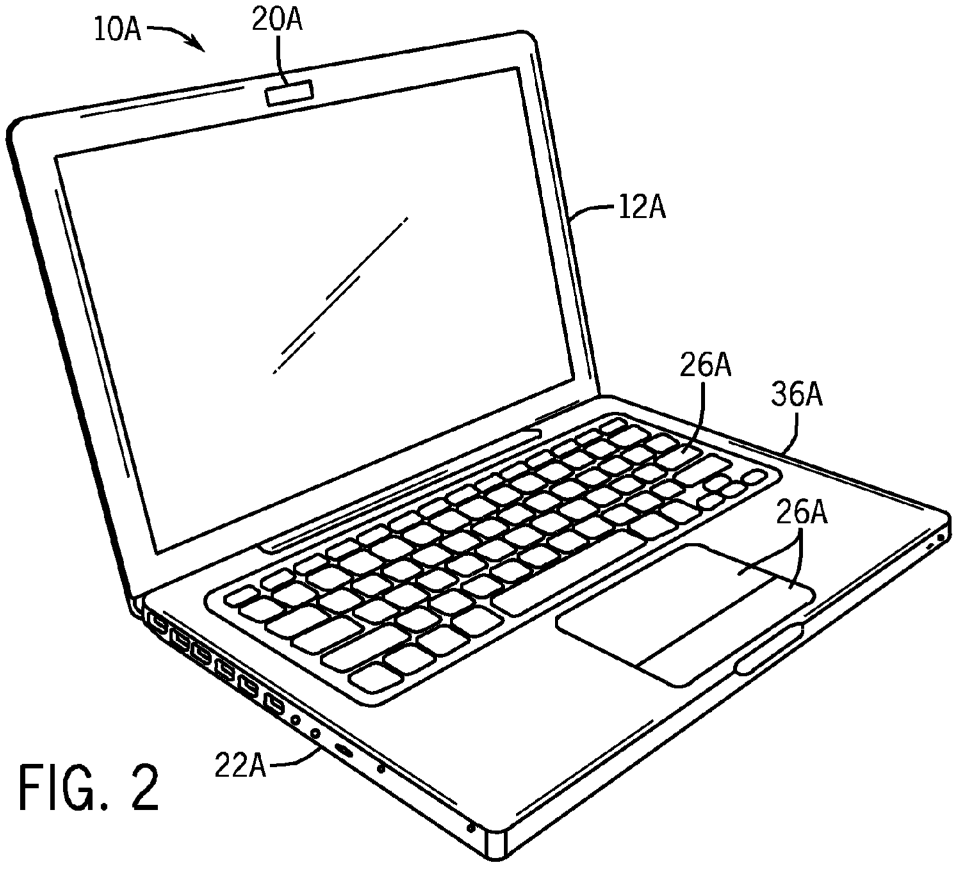
FIG. 2 is a perspective view of a computer in accordance with aspects of the present disclosure.

FIG. 2 depicts an example of an electronic device 10A in the form of a laptop computer. As shown in FIG. 2, electronic device 10A includes a housing 36A that supports and protects interior components, such as processors, circuitry, and controllers, among others. Housing 36A also allows access to user input devices 26A, such as a keypad, touchpad, and buttons, that may be used to interact with electronic device 10A. For example, user input devices 26A may be manipulated by a user to operate a GUI and/or applications running on electronic device 10A. In certain embodiments, input devices 26A may be manipulated by a user to adjust brightness settings and/or adjustment profiles 30 (FIG. 1) for display 12A. The brightness of display 12A also may be adjusted based on feedback from one or more ambient light sensors 20A. Electronic device 10A also may include various I/O ports 22A that allow connection of electronic device 10A to external devices, such as a power source, printer, network, or other electronic device.

Figure 3:
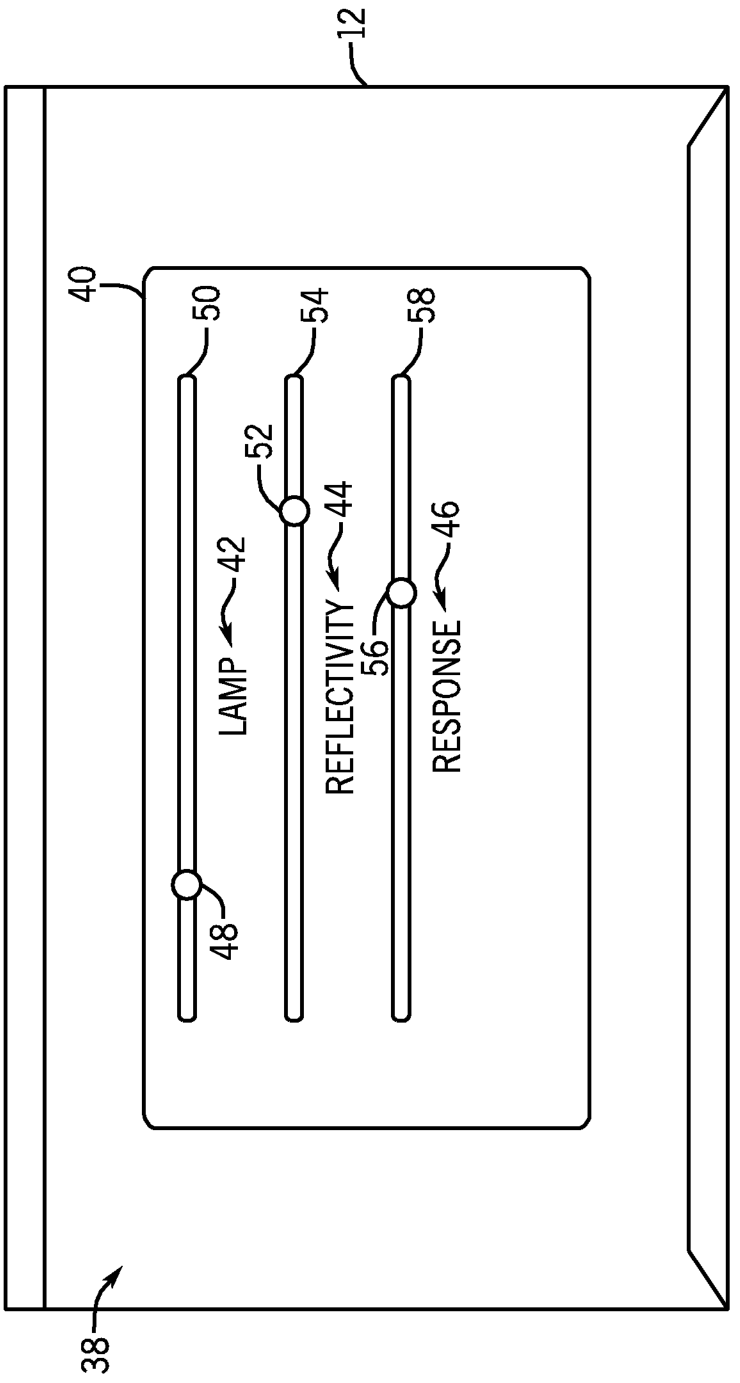
FIG. 3 is a front view of a user interface that may be employed to adjust the brightness of the display of FIG. 1, in accordance with aspects of the present disclosure.

FIG. 3 depicts an embodiment of a GUI 38 that may be employed to adjust brightness settings for display 12. GUI 38 may include various layers, windows, screens, templates, or other graphical elements that may be displayed in all, or a portion, of display 12. For example, GUI 38 may include a window 40 that displays various options for adjusting the brightness of display 12. Within window 40, labels 42, 44, and 46 identify graphical elements 48, 50, 52, 54, 56, and 58 that may be adjusted by a user to change the brightness settings for display 12. In particular, graphical element 48 may be a slider that a user may move along graphical element 50 to increase or decrease the light emitted by the lamp within backlight 14. For example, a user may increase the lamp luminosity if she desires a brighter display 12 and may decrease the lamp luminosity if she desires a more dim display 12. A user also may adjust the brightness settings by changing the perceived reflectivity of display 12. The reflectivity adjustment may be varied to change how reflective the surface of display 12 appears to a user. For example, a user may move graphical element 52, which may be a slider, along graphical element 54 to increase or decrease the perceived reflectivity of display 12. Further, a user may adjust the rate of the brightness adjustment. For example, a user may move graphical element 56, which may be may be a slider, along graphical element 58 to increase or decrease the rate of the brightness adjustment. A user may increase the response rate if she desires the brightness adjustment to be made quickly, while a user may decrease the response rate if she desires the brightness adjustment to be made more slowly.

A user may move graphical elements 48, 52, and 56 using an input device 26 (FIG. 1) of electronic device 10 (FIG. 1). For example, a user may use a mouse, keyboard, or touchscreen to move graphical elements 48, 52, and 56. As described above with respect to FIG. 1, processor 18 may receive the user input through I/O controller 24 and may provide a control signal to display controller 16 to vary the brightness of backlight 14. Based on the user input, display controller 16 also may modify one or more adjustment profiles 30 (FIG. 1) that specify how the brightness should be adjusted. As may be appreciated, the graphical elements described herein are provided by way of example only, and are not intended to be limiting. In other embodiments, other types of graphical elements, such as virtual buttons, wheels, or the like, or other types of input devices, such as physical wheels, buttons, or the like, may be employed.

Figure 4:
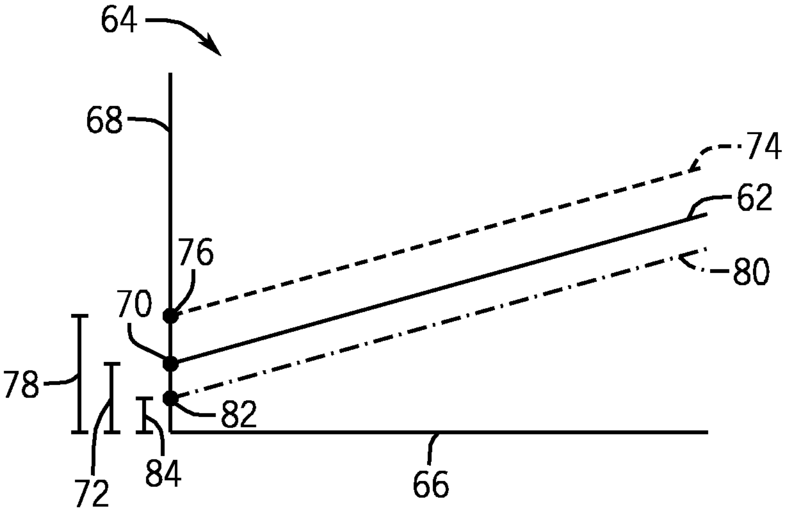
FIG. 4 is a chart depicting a profile for adjusting display brightness, in accordance with aspects of the present disclosure.
Figure 5:
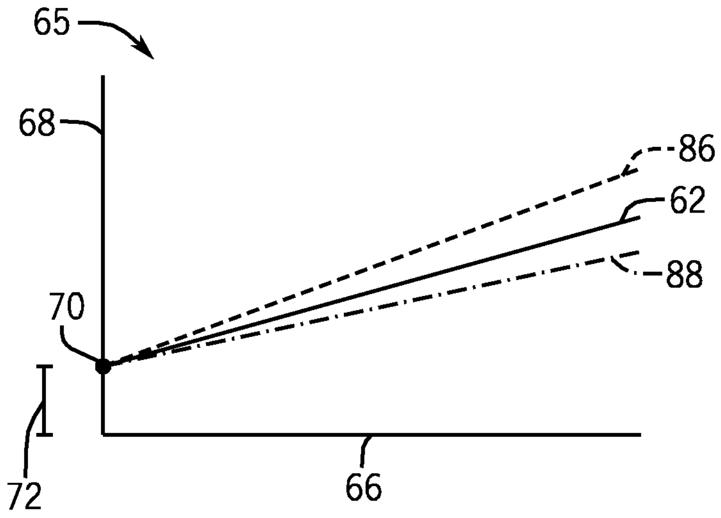
FIG. 5 is a chart depicting modified profiles for adjusting display brightness, in accordance with aspects of the present disclosure.

FIGS. 4 and 5 depict charts 64 and 65 of an adjustment profile 62 that may govern the changes in brightness for display 12 as the ambient light level changes. Charts 64 and 65 includes an x-axis 66 that represents ambient light levels and a y-axis 68 that represents brightness levels for display 12. As indicated by adjustment profile 62, the brightness of display 12 may generally increase as the ambient light level increases. FIG. 4 shows how the offset of adjustment profile 62 may be modified in response to receiving a user adjustment for the lamp luminosity setting, while FIG. 5 shows how the slope of adjustment profile 62 may be modified in response to receiving a user adjustment for the reflectivity setting.

As shown in FIG. 4, adjustment profile 62 intersects y-axis 68 at a point 70 that is offset from x-axis 66 by a distance 72. When a user adjusts the lamp luminosity of display 12, the offset for adjustment profile 62 may be increased or decreased in response to the user adjustment. For example, when a user moves graphical element 48 to the right along graphical element 50 (FIG. 3), the offset may be increased to modify adjustment profile 62 to produce a modified adjustment profile 74. Modified adjustment profile 74 intersects y-axis 68 at a point 76 that is offset from x-axis 66 by a distance 78. As can be seen by comparing adjustment profiles 62 and 74, distance 78 is greater than distance 72, and accordingly, the offset of the adjustment profile has increased in response to increasing the lamp luminosity. In another example, when a user moves graphical element 48 to the left along graphical element 50 (FIG. 3), the offset may be decreased to modify adjustment profile 62 to produce a modified adjustment profile 80. Modified adjustment profile 80 intersects y-axis 68 at a point 82 that is offset from x-axis 66 by a distance 84. As can be seen by comparing adjustment profiles 62 and 80, distance 84 is less than distance 72, and accordingly, the offset of the adjustment profile has decreased in response to decreasing the lamp luminosity. Further, as can be seen by comparing modified adjustment profiles 74 and 80 to adjustment profile 62, the slope of the adjustment profiles has remained unchanged while the offset has increased or decreased in response to the user input.

FIG. 5 depicts how user adjustments to the reflectivity setting for display 12 may affect adjustment profile 62. Similar to FIG. 4, adjustment profile 62 intersects y-axis at point 70, which is offset from x-axis 66 by distance 72. Adjustment profile 62 has a constant slope that defines a brightness response as the ambient light level changes. When a user adjusts the reflectivity setting of display 12, the slope of adjustment profile 62 may be increased or decreased in response to the user adjustment. For example, when a user moves graphical element 52 to the right along graphical element 54 (FIG. 3), the slope may be increased to modify adjustment profile 62 to produce a modified adjustment profile 86. In another example, when a user moves graphical element 52 to the left along graphical element 54 (FIG. 3), the slope may be decreased to modify adjustment profile 62 to produce a modified adjustment profile 88. As can be seen by comparing modified adjustment profiles 86 and 88 to adjustment profile 62, the offset (represented by distance 72) has remained unchanged while the slope has increased or decreased in response to the user input.

As shown in FIG. 5, the slope of adjustment profile 62 has been changed by rotating the adjustment profile about point 70 where adjustment profile 62 intersects y-axis 68. In these embodiments, changes to the reflectivity setting have adjusted the slope without changing the offset of the adjustment profile. However, in other embodiments, the slope of adjustment profile 62 may be changed by rotating adjustment profile 62 around another point along adjustment profile 62. In these embodiments, the changes to the slope also may result in a change to the offset of the adjustment profile.

Figure 6:
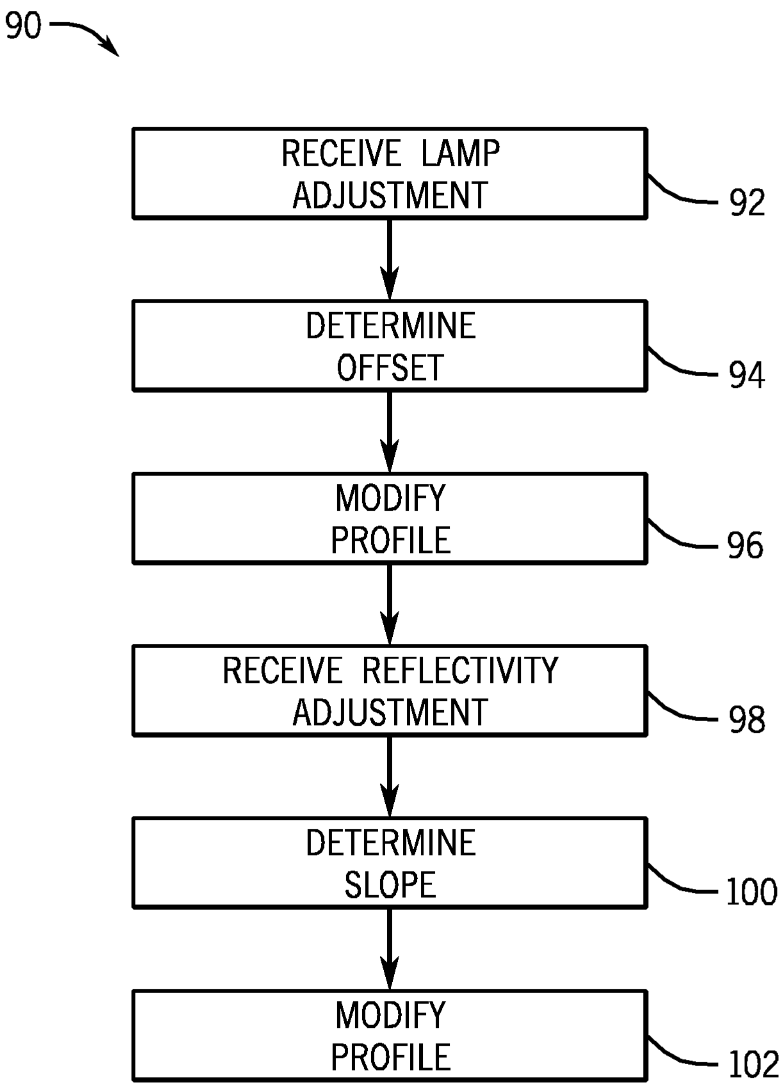
FIG. 6 is a flowchart depicting a method for modifying a profile for adjusting display brightness, in accordance with aspects of the present disclosure.

FIG. 6 depicts a method 90 for modifying a brightness adjustment profile in response to user adjustment of the lamp luminosity and/or the display reflectivity setting. Method 90 may begin by receiving (block 92) a lamp adjustment. For example, as shown in FIG. 3, a user may adjust the lamp luminosity through GUI 38 of electronic device 10. In response to receiving the lamp adjustment, display controller 16 may determine (block 94) the offset for the adjustment profile. For example, in certain embodiments, the position of slider 48 may determine the offset value; with the maximum offset value corresponding to the rightmost position along graphical element 50 and the minimum offset value corresponding to the leftmost position along graphical element 50. However, in other embodiments, display controller 16 may determine an amount of change that should be applied to the current offset based on the amount and direction of movement in graphical element 48. According to certain embodiments, display controller 16 may employ one or more algorithms and/or lookup tables, to calculate the new offset based on the user input. For example, display controller 16 may employ one or more algorithms and/or lookup tables to directly determine the new offset based on the user input. In another example, display controller 16 may then calculate the new offset by increasing or decreasing the current offset by the amount of change in the offset that corresponds to the user input.

Further, in certain embodiments, the offset may be dependent on both user input received through GUI 38 and the ambient light level. For example, electronic device 10 may measure the ambient light level through light sensor 20, as described above with respect to FIG. 1. Based on the detected ambient light level, display controller 16 may determine the amount of change that should be applied to the offset in response to movement of graphical element 48 (FIG. 3). In certain embodiments, display controller 16 may apply a smaller change to the offset when electronic device 10 is located in an environment with high ambient light levels than when electronic device 10 is located in an environment with lower ambient light levels. Further, in certain embodiments, the lamp of backlight 14 may be turned off when the ambient light level reaches a certain level. If the ambient light level is close to the ambient light level where the lamp may be turned off, display controller 16 may adjust the offset by only a small amount. On the other hand, if the ambient light level is low, display controller 16 may adjust the offset by a larger amount.

After determining (block 94) the offset, display controller 16 may modify (block 96) the current adjustment profile by increasing or decreasing the offset to the determined value. For example, display controller may use the determined offset in combination with the slope of the current adjustment profile to calculate a modified adjustment profile. In certain embodiments, display controller 16 may retrieve the current slope from storage 28 and may employ one or more algorithms to calculate the modified adjustment profile. According to certain embodiments, display controller 16 may produce modified adjustment profile 74 or 80, as shown in FIG. 4.

Method 90 may continue by receiving (block 98) a reflectivity adjustment. For example, as shown in FIG. 3, a user may adjust the reflectivity setting through GUI 38 of electronic device 10. In response to receiving the reflectivity adjustment, display controller 16 may determine (block 100) the slope for the adjustment profile. For example, in certain embodiments, the position of slider 52 may determine the slope value, with the maximum slope value corresponding to the rightmost position along graphical element 54 and the minimum slope value corresponding to the leftmost position along graphical element 54. However, in other embodiments, display controller 16 may determine an amount of change that should be applied to the current slope based on the amount and direction of movement in graphical element 56. According to certain embodiments, display controller 16 may employ one or more algorithms and/or lookup tables, to calculate the new slope based on the user input. For example, display controller 16 may employ one or more algorithms and/or lookup tables to directly determine the new slope based on the user input. In another example, display controller 16 may then calculate the new slope by increasing or decreasing the current offset by the amount of change in the slope that corresponds to the user input.

After determining the slope, display controller 16 may modify (block 102) the current adjustment profile by increasing or decreasing the slope to the determined value. For example, display controller may use the determined slope in combination with the offset of the current adjustment profile to calculate a modified adjustment profile. In certain embodiments, display controller 16 may retrieve the current offset from storage 28 and may employ one or more algorithms to calculate the modified adjustment profile. According to certain embodiments, display controller 16 may produce modified adjustment profile 86 or 88, as shown in FIG. 5.

As shown in FIG. 6, method 90 includes modifying the adjustment profiles based on both lamp adjustments and reflectivity adjustments. However, in other embodiments, only a portion of method 90 may be performed. For example, if a user only adjusts the lamp luminosity, blocks 98 to 102, which adjust the reflectivity, may be omitted. In another example, if a user only adjusts the reflectivity setting, blocks 92 to 96, which adjust the lamp luminosity, may be omitted.

Figure 7:
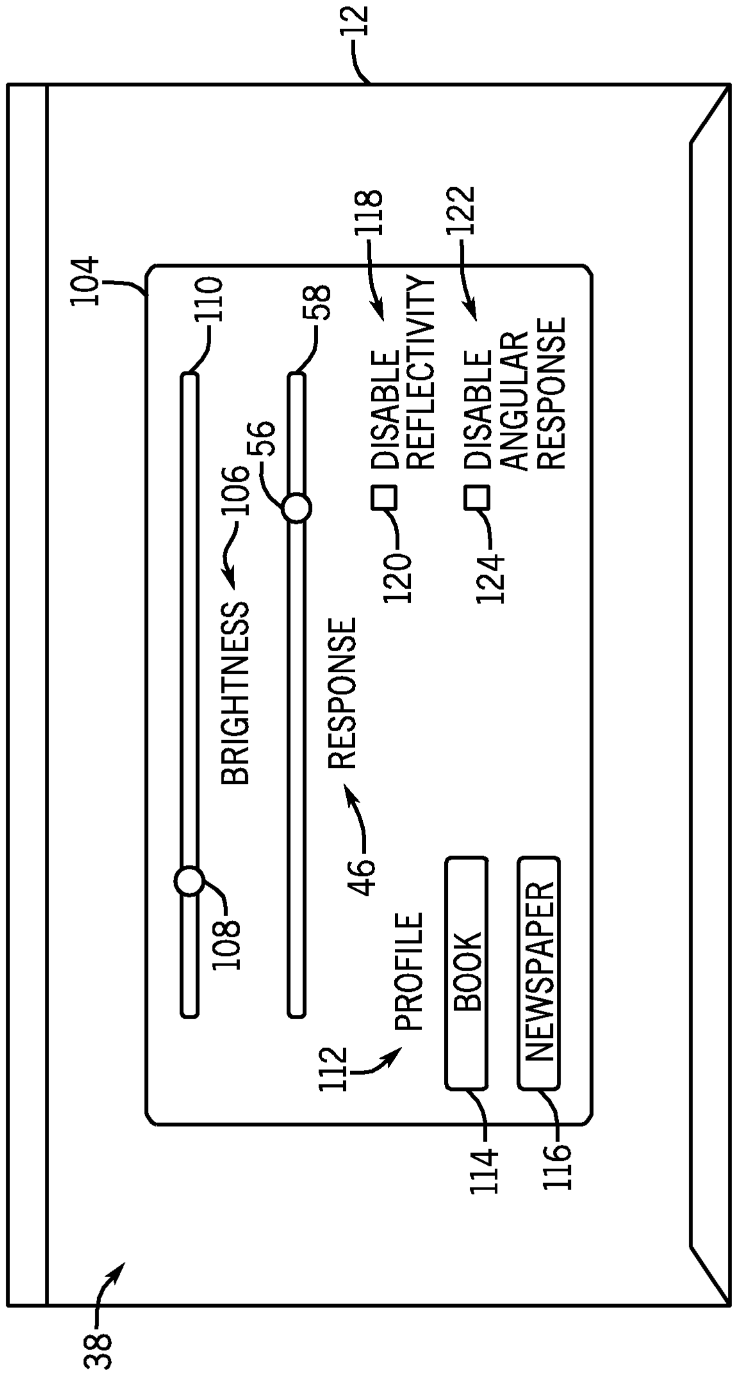
FIG. 7 is a front view of another embodiment of a user interface that may be employed to adjust the brightness of the display of FIG. 1, in accordance with aspects of the present disclosure.

FIG. 7 depicts another embodiment of GUI 38 that may be employed to adjust a brightness setting for display 12. In this embodiment, a single slider, or other suitable type of graphical element, may be manipulated by a user to vary both the lamp brightness and the perceived reflectivity. For example, window 104 includes a label 106 that identifies graphical elements 108 and 110 that may be adjusted by a user to change the brightness setting for display 12. In particular, graphical element 108 may be a slider that a user may move along graphical element 110 to increase or decrease the brightness of display 12. As graphical element 108 is moved along graphical element 110, display controller 16 may vary both the slope and offset of the adjustment profile, as described below with respect to FIGS. 8 to 15. Window 104 also includes graphical element 56 that may be moved along graphical element 58 to adjust the response rate, as described above with respect to FIG. 3.

Window 104 includes a label 112 identifying graphical elements 114 and 116 that may be selected to enable profiles that determine the perceived reflectivity of display 12. According to certain embodiments, the profiles may determine the amount of slope adjustment that is performed in response to movement of graphical element 108. For example, the graphical element 114 may be selected to employ a slope adjustment designed to simulate the reflectivity of a book, while graphical element 116 may be selected to employ a slope adjustment designed to simulate the reflectivity of a newspaper. Further, in certain embodiments, graphical elements 114 and 116 may determine the type angular adjustment profile employed to compensate for ambient light angles, as described below with respect to FIGS. 34 and 35.

Window 104 further may include a label 118 identifying a graphical element, such as a selection box 120 that may be selected to disable a reflectivity adjustment for display 12. When box 120 is selected, a reflectivity adjustment may not be performed when a user moves graphical element 108. In particular, the slope of the adjustment profile or a section of the adjustment profile may remain constant, while only the offset is changed to increase or decrease the lamp brightness. However, when box 120 is not selected, both the slope and offset may be varied based on user input, as described below with respect to FIGS. 8 to 15.

Window also may include a label 122 identifying a graphical element, such as a selection box 124 that may be selected to disable an angular response for display 12. When box 124 is not selected, the brightness of display 12 also may be adjusted based on the angle of incidence of the ambient light source, as described further below with respect to FIGS. 34 and 35. For example, the brightness of display 12 may be increased in direct light and decreased in indirect light to simulate the reflection of ambient light off of a hard copy material. When box 124 is selected, the angular response feature may be disabled and the brightness may be adjusted without accounting for the angle of incidence of the ambient light source.

Figure 8:
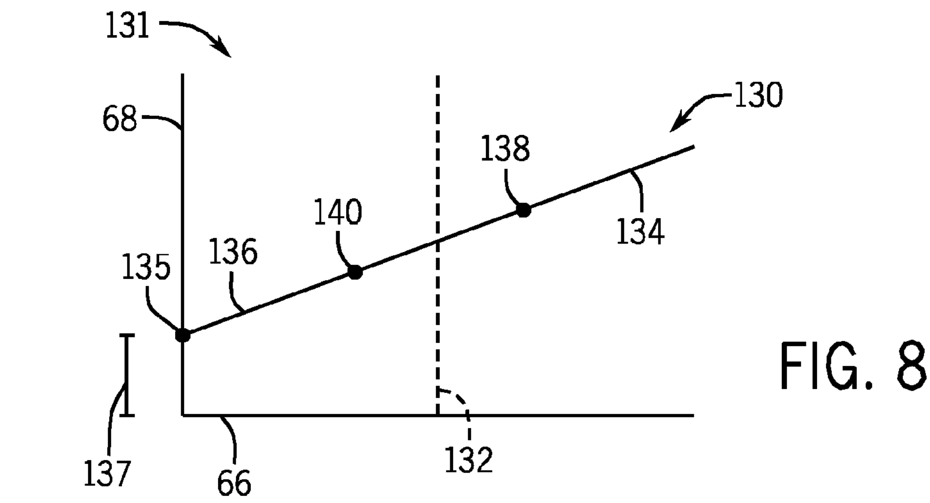
FIG. 8 is a chart illustrating another embodiment of a profile for adjusting display brightness, in accordance with aspects of the present disclosure.

FIG. 8 depicts an adjustment profile 130 shown on a chart 131 where x-axis 66 represents ambient light levels and y-axis 68 represents brightness levels for display 12. Adjustment profile 130 may govern the changes in brightness for display 12 as the ambient light level changes. As indicated by adjustment profile 130, the brightness of display 12 may generally increase as the ambient light level increases.

An ambient light threshold 132 may separate adjustment profile 130 into a bright section 134 shown generally to the right of ambient light threshold 132 and a dim section 136 shown generally to the left of ambient light threshold 132. As shown, ambient light threshold 132 divides adjustment profile 130 into approximately equal sections. However, in other embodiments, ambient light threshold 132 may be disposed closer to or farther from y-axis 68 to provide other relative sizes of sections 134 and 136. According to certain embodiments, ambient light threshold 132 may divide adjustment profile 130 so that dim section 136 represents approximately 5 to 20 percent of adjustment profile 130. For example, in certain embodiments, dim section 136 may determine brightness levels ranging from 3 to 500 nits, or more specifically, 3 to 50 nits, while bright section 134 may determine brightness levels greater than approximately 150 nits. However, in other embodiments, ambient light threshold 132 may be disposed at any location along x-axis 66. For example, in certain embodiments, ambient light threshold 132 may correspond to an ambient light level of approximately 15 to 200 lux, or more specifically, approximately 50 lux.

As shown, adjustment profile 130 has a constant slope that defines a brightness response as the ambient light level changes. Adjustment profile 130 intersects y-axis 68 at a point 135 that is offset from x-axis 66 by a distance 137. As a user adjusts a brightness setting of display 12, the slope and offset of adjustment profile 130 may be modified based on the adjusted brightness setting. To facilitate adjustment of the profile, adjustment profile 130 also may include transition points 138 and 140. In particular, transition point 138 is located within bright section 134 of adjustment profile 130 and transition point 140 is located within dim section 136 of adjustment profile 130.

When a user adjusts a brightness setting of display 12, the slope of adjustment profile 130 may be modified such that the new brightness setting and the transition point 138 or 140 on the opposite side of ambient light threshold 132 both intersect the adjustment profile. For example, if a user makes a brightness adjustment through GUI 38 (FIG. 7) while display 12 is located in an environment where the ambient light level exceeds ambient light threshold 132, the slope may be adjusted until the new brightness setting and transition point 140 intersect the brightness adjustment profile, as described further below with respect to FIG. 9. Similarly, if a user makes a brightness adjustment through GUI 38 (FIG. 7) while display 12 is located in an environment where the ambient light level is below ambient light threshold 132, the slope may be adjusted until the new brightness setting and transition point 138 intersect the brightness adjustment profile, as described further below with respect to FIG. 10.

According to certain embodiments, transition points 138 and 140 may correspond to ambient light levels that may be set by a manufacturer to be a certain percentage or ambient light level above or below ambient light threshold 132. For example, in certain embodiments, transition point 138 may correspond to an ambient light level of approximately 300 to 800 lux, or more specifically 300 to 600 lux. Transition point 140 may correspond to an ambient light level of approximately 0 to 50 lux, or more specifically, approximately 0 to 20 lux. However, in other embodiments, the ambient light levels corresponding to transition points 138 and 140 may vary depending on factors such as the ambient light levels where the electronic device is designed to be used, the operational range of the backlight, and/or the operational range of the ambient light sensor, among others. Further, the locations of transition points 138 and 140 on adjustment profile 130 may be adjusted by a user through a GUI. Moreover, in certain embodiments, the locations of transition points 138 and 140 may correspond to the most recent previous brightness setting input by a user for that section 134 or 136. For example, transition point 138 may be the last brightness setting that was received when the ambient light level was above ambient light threshold 132. Similarly, transition point 140 may be the last brightness setting that was received when the ambient light level was below ambient light threshold 132. In this example, the locations of transitions points 138 and 140 may vary as a user adjusts the brightness of backlight 14. However, in other embodiments, the locations of transition points 138 and 140 may remain fixed.

Figure 9:
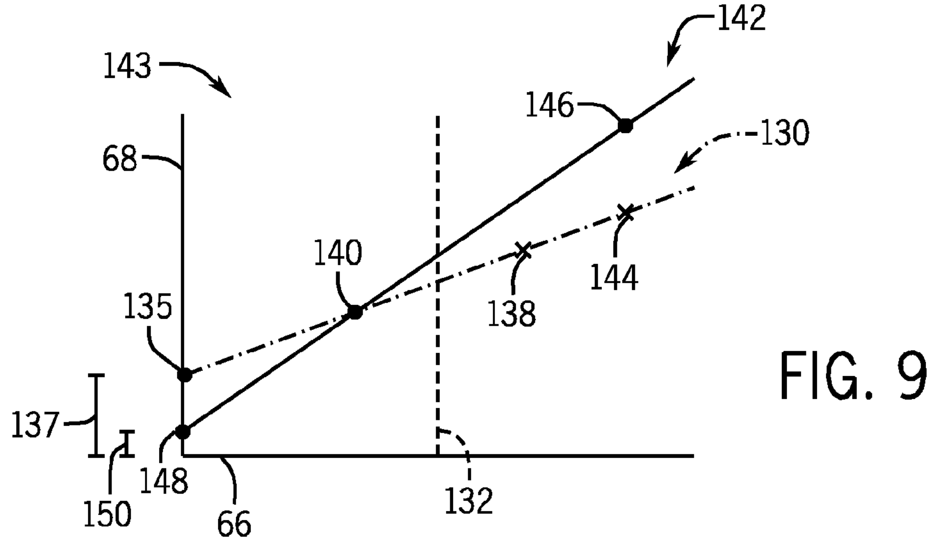
FIG. 9 is a chart depicting a modified profile for adjusting display brightness, in accordance with aspects of the present disclosure.

FIG. 9 depicts a modified adjustment profile 142 on a chart 143 along with the original adjustment profile 130, shown in dashed lines. To produce modified adjustment profile 142, a user has increased the brightness of display 12 from a current brightness setting 144 to a new brightness setting 146 at an ambient light level above ambient light threshold 132. For example, as shown in FIG. 7, a user may move graphical element 108 to the right along graphical element 110 while display 12 is located in an environment that has an ambient light level that is greater than ambient light threshold 132.

In response to receiving the new brightness setting, display controller 16 (FIG. 1) may modify the slope of adjustment profile 130 to produce a modified adjustment profile 142 that intersects new brightness setting 146 and transition point 140, which lies on the opposite side of ambient light threshold 132 from new brightness setting 146. Modified adjustment profile 142 intersects y-axis 68 at a point 148 that is offset from x-axis 66 by a distance 150. As seen by comparing the original adjustment profile 130 to the modified adjustment profile 142, the adjustment profile has been increased in slope and decreased in offset. In other embodiments, where the new brightness setting is less than the current brightness setting 144, the adjustment profile may be decreased in slope and increased in offset.

Figure 10:
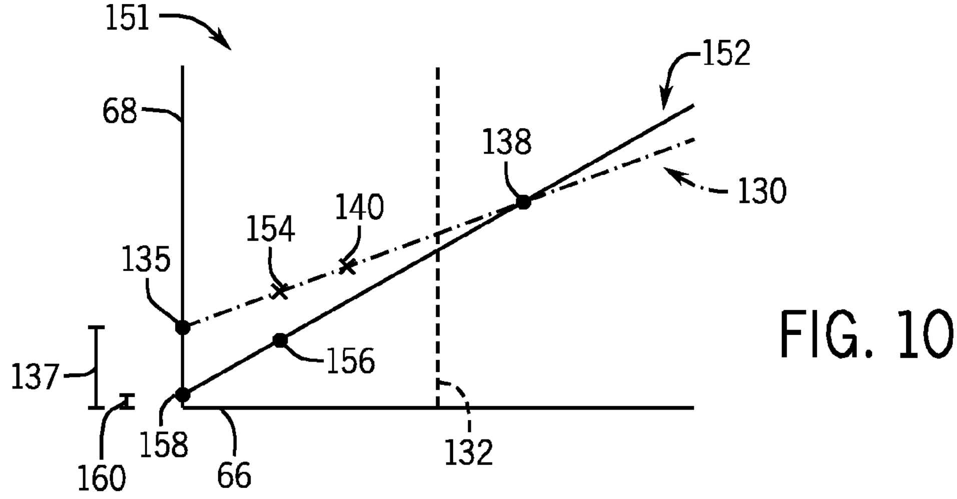
FIG. 10 is a chart depicting another modified profile for adjusting display brightness, in accordance with aspects of the present disclosure.

FIG. 10 is a chart 151 of another modified adjustment profile 152 that includes a modified slope. To produce modified adjustment profile 152, a user has decreased the brightness of display 12 from a current brightness setting 154 to a new brightness setting 156 at an ambient light level below ambient light threshold 132. For example, as shown in FIG. 7, a user may move graphical element 108 to the left along graphical element 110 while display 12 is located in an environment that has an ambient light level that is lower than ambient light threshold 132.

In response to receiving the new brightness setting, display controller 16 (FIG. 1) may modify the slope of adjustment profile 130 to produce a modified adjustment profile 152 that intersects new brightness setting 156 and transition point 138, which lies on the opposite side of ambient light threshold 132 from new brightness setting 156. Modified adjustment profile 152 intersects y-axis 68 at a point 158 that is offset from x-axis 66 by a distance 160. As seen by comparing the original adjustment profile 130 to the modified adjustment profile 152, the adjustment profile has been increased in slope and decreased in offset. In other embodiments, where the new brightness setting is greater than the current brightness setting 144, the adjustment profile may be decreased in slope and increased in offset.

Figure 11:
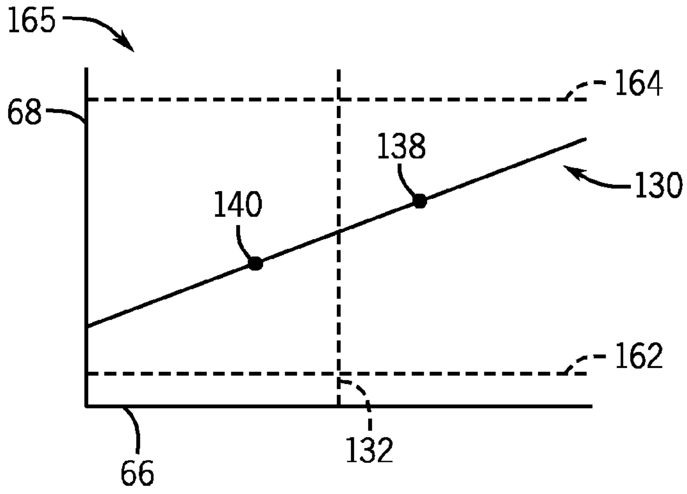
FIG. 11 is a chart depicting minimum and maximum brightness levels, in accordance with aspects of the present disclosure.
Figure 12:
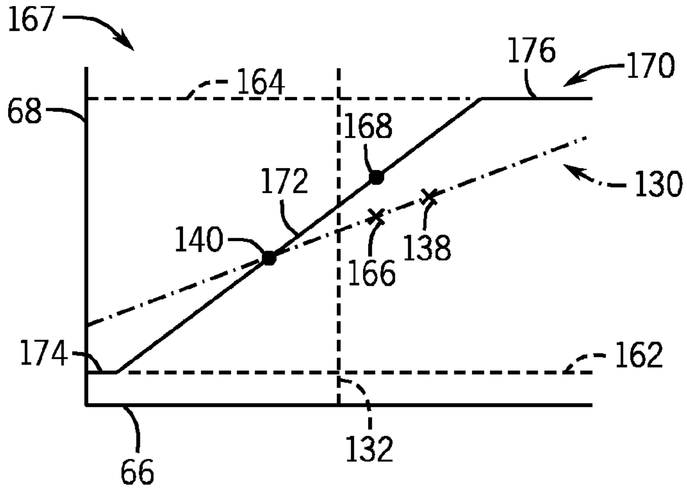
FIG. 12 is a chart depicting a modified adjustment profile with clipped portions based on the minimum and maximum brightness levels, in accordance with aspects of the present disclosure.
Figure 13:
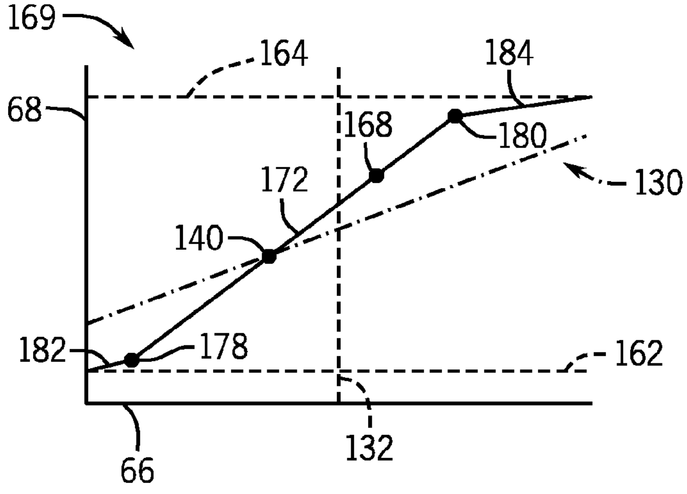
FIG. 13 is a chart depicting another embodiment of a modified adjustment profile with clipped portions based on the minimum and maximum brightness levels, in accordance with aspects of the present disclosure.

FIGS. 11 to 13 depict embodiments where portions of adjustment profile 130 may be clipped due to the operational range of backlight 14 (FIG. 1). For example, backlight 14 may be capable of producing a brightness that ranges from a minimum brightness level 162 to a maximum brightness level 164. As shown in FIG. 11 on chart 165, adjustment profile 130 may define a range of brightness levels within the minimum and maximum brightness levels 162 and 164. If a user adjustment would produce a modified adjustment profile that would exceed the minimum brightness level 162 and/or the maximum brightness level 164, a portion of the modified adjustment profile may be clipped to stay within the operational range of the backlight.

As shown in FIG. 12 on chart 167, a user may increase the brightness of display 12 from a current brightness setting 166 to a new brightness setting 168. For example, a user may adjust the brightness setting through GUI 38 (FIG. 7). In response to receiving a new brightness setting 168, display controller 16 (FIG. 1) may modify the slope of adjustment profile 130 to produce a modified adjustment profile 170 that intersects new brightness setting 168 and transition point 140, which lies on the opposite side of ambient light threshold 132 from new brightness setting 168. Modified adjustment profile 170 includes a sloped portion 172 that extends through new brightness setting 168 and transition point 140. Modified adjustment profile 170 also includes clipped portions 174 and 176 that have a slope of approximately zero and that extend along minimum brightness level 162 and maximum brightness level 164, respectively. Accordingly, clipped portions 174 and 176 prevent modified adjustment profile 170 from extending beyond the operation range of backlight 14.

As shown in FIG. 12, modified adjustment profile 172 includes two clipped portions 174 and 176. However, in other embodiments, modified adjustment profile 172 may include only one clipped portion 174 or 176, depending upon the operational range of backlight 14. Further, in certain embodiments, rather than having a slope of zero, the clipped portions may have a slope that transitions the clipped portions to just inside of or equal to the maximum and minimum brightness levels. For example, as shown in FIG. 13 on chart 169, modified adjustment profile 170 may include transition points 178 and 180 that allow the clipped portions to transition to the minimum and maximum brightness levels 162 and 164. In particular, modified adjustment profile 170 may include a clipped portion 182 that extends between transition point 178 and minimum brightness level 162 and a clipped portion 184 that extends between transition point 180 and maximum brightness level 164. According to certain embodiments, transition points 178 and 180 may be set by a manufacturer to occur at certain ambient light levels or at a percentage of the maximum and minimum brightness levels.

Figure 14:
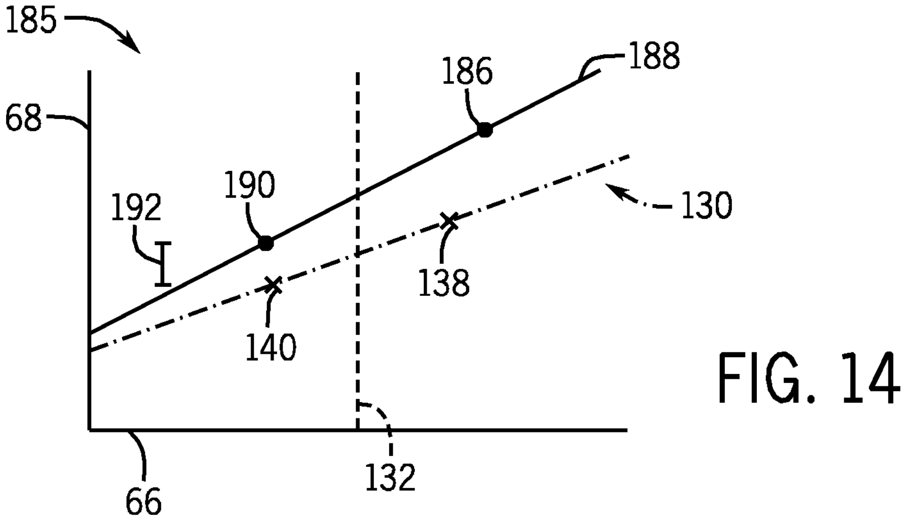
FIG. 14 is a chart depicting a modified adjustment profile of a maximum slope, in accordance with aspects of the present disclosure.
Figure 15:
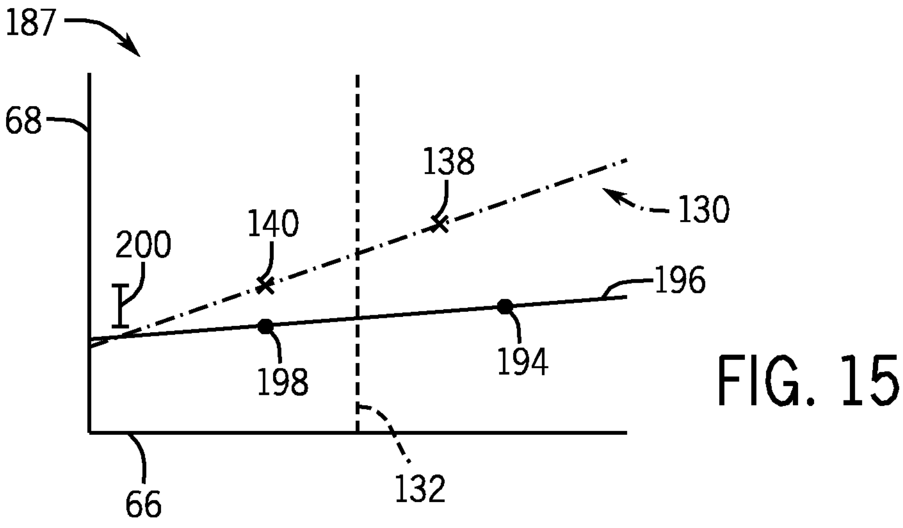
FIG. 15 is a chart depicting a modified adjustment profile of a minimum slope, in accordance with aspects of the present disclosure.

FIGS. 14 and 15 depict charts 185 and 187 of embodiments where the locations of transition points 138 and 140 may be modified to ensure that the slope of the adjustment profile is not less than a minimum slope or greater than a maximum slope. According to certain embodiments, a minimum slope, which is just slightly greater than zero, may be employed so that the display does not appear unresponsive to user adjustments. In certain embodiments, the minimum slope may be a set value. However, in other embodiments, the minimum slope may vary as the ambient light level changes and/or as the display brightness changes. For example, at low ambient light levels, a smaller minimum slope may be employed than at high ambient light levels. In certain embodiments, the minimum slope may be based on a percentage of the ambient light level and/or of the display brightness. For example, in certain embodiments, the minimum slope may be calculated by maintaining a minimum difference, such as 50 percent, between the brightness settings for transition points 138 and 140. According to certain embodiments, transition point 140 may be adjusted to have a brightness that is at least 30 to 80 percent as bright as the brightness of transition point 138. Further, in certain embodiments, the minimum difference between the brightness settings (y-axis values) for transition points 138 and 140 may vary based on the difference between the ambient light levels (x-axis values) for transition points 138 and 140. In certain embodiments, the minimum slope may be a set value. For example, in certain embodiments where x-axis 66 represents ambient light levels in lux and y-axis 68 represents brightness levels in nits, the minimum slope may be approximately 0.1. In other embodiments, the minimum slope may be set to zero.

According to certain embodiments, a maximum slope may be employed to limit the amplification of noise as brightness adjustments are performed. In certain embodiments, the maximum slope may be a set value. For example, in embodiments where x-axis 66 represents ambient light levels in lux and y-axis 68 represents brightness levels in nits, the maximum slope may have a value of approximately 0.66 to 2, or more specifically, the maximum slope may be 1. However, in other embodiments, the value of the maximum slope may vary depending on factors such as the maximum brightness of display 14 or the environment where electronic device 10 is designed to be used, among others.

FIG. 14 depicts an embodiment where display controller 16 may set the modified adjustment profile to a maximum slope rather than to a slope that is determined by intersecting a new brightness setting with a transition point 138 or 140. For example, a user may enter a new brightness setting 186 through GUI 38 (FIG. 7). In response to receiving new brightness setting 186, display controller 16 (FIG. 1) may modify the slope of adjustment profile 130 to produce a modified adjustment profile 188. However, rather than setting modified adjustment profile 130 to interest new brightness setting 186 and transition point 140, which is on the opposite side of ambient light threshold 132 from new brightness setting 186, display controller 16 may determine a modified transition point 190 that produces the maximum slope when intersected with new brightness setting 186. Modified transition point 190 may correspond to the same ambient light level on x-axis 66 as transition point 140. However, modified transition point 190 may correspond to a new brightness level on y-axis 68. In particular, modified transition point 190 may be offset from the existing transition point by a distance 192 just large enough to keep modified transition point 190 from exceeding the maximum slope. Accordingly, by adjusting the brightness level of transition point 140, the modified adjustment profile has the maximum allowed slope. Modified adjustment profile 188 then intersects new brightness setting 186 and modified transition point 190. In other embodiments, the ambient light level for transition point 140 may be adjusted to produce the maximum slope. For example, transition point 140 may be moved to the left along x-axis 66 to produce a modified adjustment profile with the maximum slope.

FIG. 15 depicts an embodiment where the modified adjustment profile may be set to the minimum slope. For example, a user may enter a new brightness setting 194 through GUI 38 (FIG. 7). In response to receiving new brightness setting 194, display controller 16 (FIG. 1) may modify the slope of adjustment profile 130 to produce a modified adjustment profile 196. However, rather than setting modified adjustment profile 130 to interest new brightness setting 194 and transition point 140, which is on the opposite side of ambient light threshold 132 from new brightness setting 186, display controller 16 may determine a modified transition point 198 that produces the minimum slope when intersected with new brightness setting 194. Modified transition point 198 may correspond to the same ambient light level on x-axis 66 as transition point 140. However, modified transition point 198 may correspond to a new brightness level on y-axis 68. In particular, modified transition point 198 may be offset from the existing transition point by a distance 200 just large enough to keep modified transition point 190 from having a slope smaller than the minimum.

Figure 16:
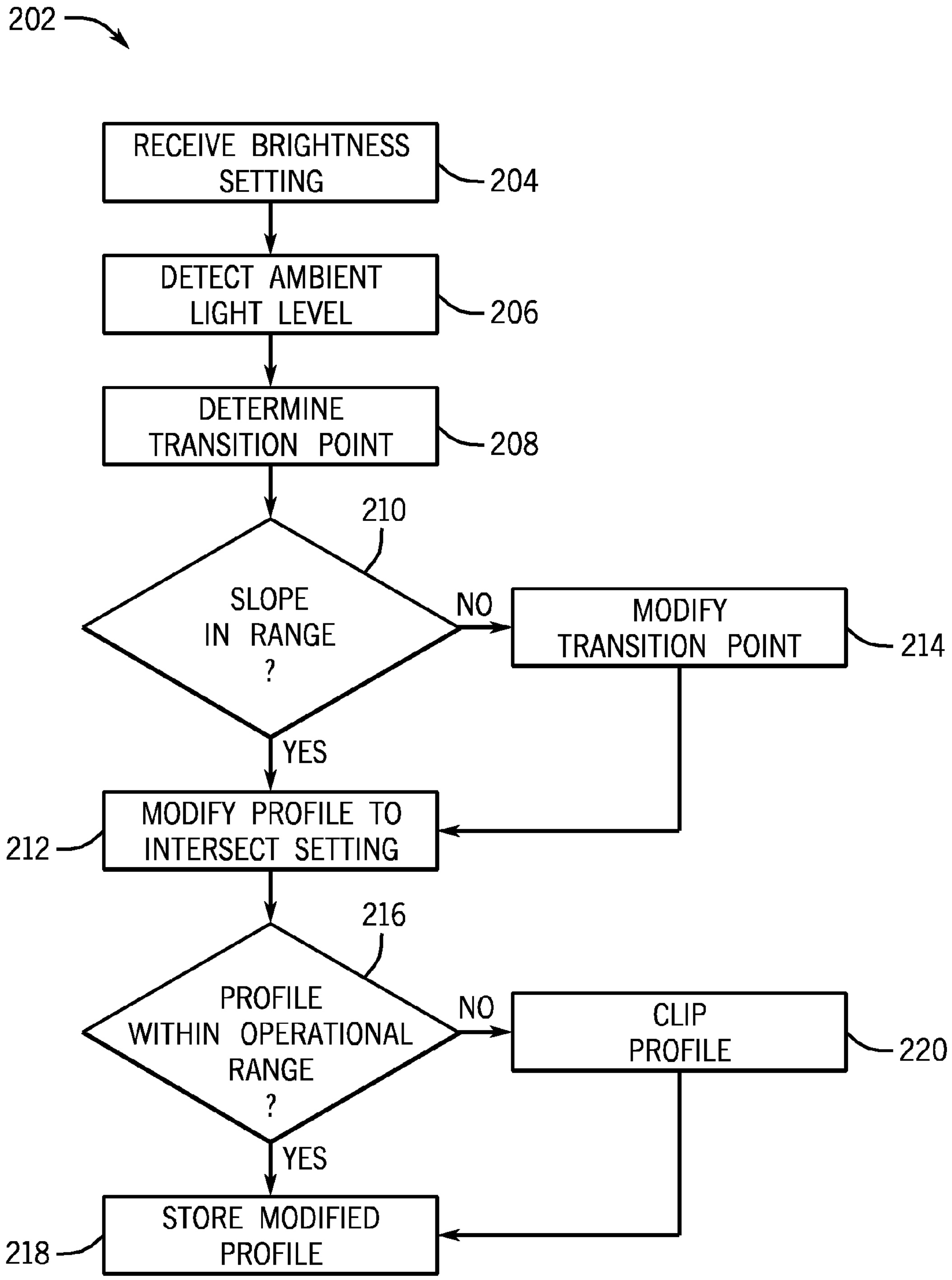
FIG. 16 is a flowchart depicting another embodiment of a method for modifying a profile for adjusting display brightness, in accordance with aspects of the present disclosure.

FIG. 16 depicts a method 202 for modifying a brightness adjustment profile. Method 202 may begin by receiving (block 204) a brightness setting. For example, as shown in FIG. 7, a user may adjust the brightness through a GUI 38 of electronic device 10. In response to receiving a brightness setting, electronic device 10 may detect (block 206) the current ambient light level. For example, electronic device 10 may measure the ambient light level through light sensor 20, as described above with respect to FIG. 1.

Based on the detected ambient light level, display controller 16 may determine (block 208) the transition point to use for the modified adjustment profile. For example, as shown in FIG. 8, display controller 16 may compare the detected ambient light level to the ambient light threshold 132 and select the transition point on the opposite side of the ambient light threshold from the detected ambient light level. If the detected ambient light level is greater than ambient light threshold 132, display controller 16 may select transition point 140. On the other hand, if the detected ambient light level is below ambient light threshold 132, display controller 16 may select transition point 138. According to certain embodiments, display controller 16 may retrieve the transition point from storage 28.

Display controller 16 may then determine (block 210) whether the slope of a modified adjustment profile that would intersect the new brightness setting and the transition point would be within the maximum and minimum slope range. For example, display controller 16 may calculate the slope of a line that insects the new brightness setting and the selected transition point. In certain embodiments, display controller 16 may calculate the slope using one or more algorithms or lookup tables. Display controller 16 may then determine whether the adjusted slope would be less than or equal to the maximum slope and greater than or equal to the minimum slope. If the slope is within range, display controller 16 may modify (block 212) the adjustment profile to interest with the determined transition point and the new brightness setting. For example, display controller 16 may generate a modified adjustment profile based on the adjusted slope that was used to determine (block 210) whether the adjusted would be in range. According to certain embodiments, display controller 16 may produce modified adjustment profile 142 or 152 as shown in FIGS. 9 and 10.

On the other hand, if the slope is not within the maximum and minimum slope range, display controller 16 may modify (block 214) the determined transition point. Display controller 16 may adjust the brightness level (y-axis) of the transition point by an amount needed to produce the maximum or minimum slope. For example, display controller 16 may retrieve the existing x-axis coordinate for the transition point, for example, from storage 28. Display controller 16 may then use one or more algorithms or lookup tables to calculate the y-axis coordinate that would produce the maximum or minimum slope. Display controller 16 may then store the existing x-axis coordinate and the new y-axis coordinate as the new transition point. According to certain embodiments, display controller 16 may produce a modified transition point 190 or 198 as shown in FIGS. 14 and 15. Further, in certain embodiments, display controller 16 may adjust the ambient light level (x-axis) of the transition point instead of, or in addition to, adjusting the brightness level. Display controller 16 may then modify (block 212) the adjustment profile to interest the modified transition point and the new brightness setting.

After modifying (block 212) the adjustment profile, display controller 16 may determine whether the modified adjustment profile exceeds the operational range of backlight 14. For example, display controller 16 may determine whether the modified adjustment profile specifies a brightness that is greater than the maximum brightness or less than the minimum brightness that may be produced by backlight 14. If the modified adjustment profile is within the operational range, the modified adjustment profile may be stored (block 218). For example, display controller 16 may store the modified adjustment profile in storage 28 (FIG. 1) of electronic device 10.

On the other hand, if display controller 16 determines (block 216) that the modified adjustment profile exceeds the operational range, display controller 16 may clip (block 220) portions of the adjustment profile that fall outside of the operational range. For example, as shown in FIG. 12, display controller 16 may set portions of the modified adjustment profile that would exceed the operational range to the maximum and minimum brightness levels. In another example, as shown in FIG. 13, display controller 16 may transition portions of the adjustment profile to the maximum and minimum brightness levels. Display controller 16 may then store (block 218) the modified profile.

Figure 17:
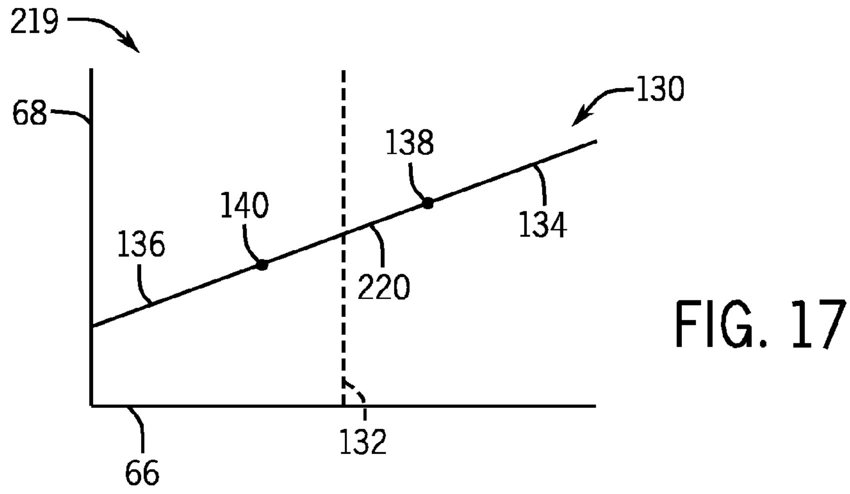
FIG. 17 is a chart illustrating a transition section of the profile for adjusting display brightness, in accordance with aspects of the present disclosure.
Figure 18:
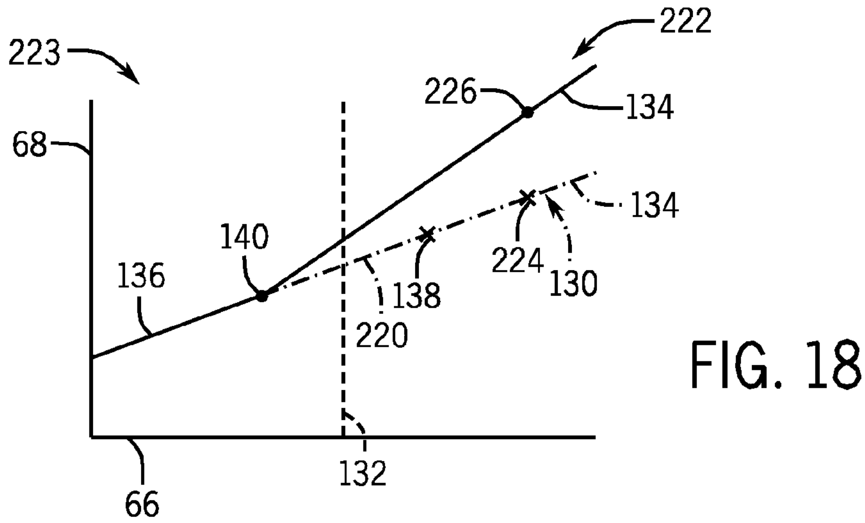
FIG. 18 is a chart depicting another modified profile for adjusting display brightness, in accordance with aspects of the present disclosure.
Figure 19:
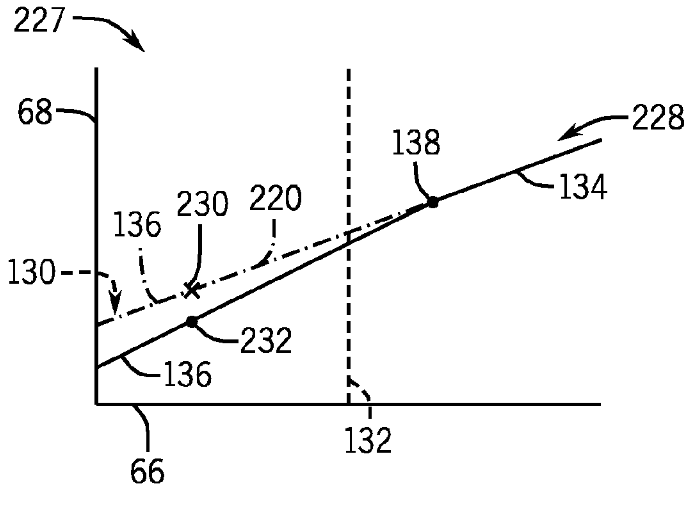
FIG. 19 is a chart depicting another modified profile for adjusting display brightness, in accordance with aspects of the present disclosure.

FIGS. 17 through 19 illustrate another method of modifying an adjustment profile in response to receiving a new brightness setting. Rather that modifying the slope of the entire adjustment profile, each section 134 and 136 may be modified independently of the other section 136 or 134 to provide different brightness responses for each section 134 and 136. In particular, the slope of each section 134 and 136 may be changed independently of the slope of the other section 136 or 134.

According to certain embodiments, the slope of a section 134 or 136 may be modified when a user adjusts a brightness setting while display 12 is located in an environment with an ambient light level within that section 134 or 136. For example, if a user makes a brightness adjustment through GUI 38 (FIG. 7) while display 12 is located in an environment where the ambient light level exceeds ambient light threshold 132, the slope of bright section 134 may be adjusted. Similarly, if a user makes a brightness adjustment through GUI 38 (FIG. 7) while display 12 is located in an environment where the ambient light level is below ambient light threshold 132, the slope of dim section 136 may be adjusted. In other embodiments, the slope of sections 134 and 136 may be modified based on user inputs received through GUI 38 that specify the section 134 or 136 to modify. For example, a GUI may include one or more graphical elements corresponding to each section 134 and 136 that may be manipulated to adjust the slope of each section 134 or 136 individually.

As shown on chart 219 of FIG. 17, in addition to transition points 138 and 140, adjustment profile 130 may include a transition section 220, generally defined as the section of the adjustment profile between transition points 138 and 140. Transition section 220 may include a portion of bright section 134 and a portion of dim section 136 and may be modified along with either bright section 134 or dim section 136 to provide a smoother transition between sections 134 and 136 of adjustment profile 130. For example, when a slope of bright section 134 is adjusted, the slope of transition section 220 also may be adjusted to provide a more gradual change from bright section 134 to dim section 136. Similarly, when the slope of dim section 136 is adjusted, the slope of transition section 220 also may be adjusted to provide a smoother transition from dim section 136 to bright section 130.

FIG. 18 depicts a modified adjustment profile 222 on a chart 223 along with the original adjustment profile 130, shown in dashed lines. To produce modified adjustment profile 222, a user has increased the brightness of display 12 from a current brightness setting 224 to a new brightness setting 226 at an ambient light above ambient light threshold 132. For example, as shown in FIG. 7, a user may move graphical element 108 to the right along graphical element 110 while display 12 is located in an environment that has an ambient light level that is greater than ambient light threshold 132.

In response to receiving the new brightness setting, display controller 16 (FIG. 1) may modify the bright section 134 of adjustment profile 130 until bright section 134 intersects with the new brightness setting 226. In particular, display controller 16 may select the transition point 140 that lies on the opposite side of ambient light threshold 132 from new brightness setting 226. Display controller 16 may then increase the slope of each section 220 and 134 that lies to the right of transition point 140. As seen by comparing the original adjustment profile 130 to the modified adjustment profile 222, the transition section 220 and bright section 134 have been increased in slope so that both transition point 140 and new brightness setting 226 intersect modified adjustment profile 222. In other embodiments where the new brightness setting is less than the current brightness setting 224, transition section 220 and bright section 134 may be decreased in slope until the new brightness setting and transition point 140 both intersect the modified adjustment profile.

FIG. 19 is a chart 227 of a modified adjustment profile 228 that includes a modified dim section 136 and transition section 220. To produce modified adjustment profile 228, a user has decreased the brightness of display 12 from a current brightness setting 230 to a new brightness setting 232 at an ambient light level below ambient light threshold 132. For example, as shown in FIG. 7, a user may move graphical element 108 to the left along graphical element 110 while display 12 is located in an environment that has an ambient light level that is lower than ambient light threshold 132.

In response to receiving the new brightness setting, display controller 16 (FIG. 1) may modify the dim section 136 of adjustment profile 130 until dim section 136 intersects the new brightness setting 232. In particular, display controller 16 may select the transition point 138 that lies on the opposite side of ambient light threshold 132 from new brightness setting 232. Display controller 16 may then increase the slope of each section 220 and 136 that lies to the left of transition point 138. As seen by comparing the original adjustment profile 130 to the modified adjustment profile 228, the transition section 220 and dim section 136 have been increased in slope so that both transition point 138 and new brightness setting 232 intersect modified adjustment profile 228. In other embodiments, where the new brightness setting is greater than the current brightness setting 230, transition section 220 and dim section 136 may be decreased in slope until the new brightness setting and transition point 138 both intersect the modified profile.

As shown in FIGS. 8 through 19, the slope of sections 134, 136, and/or 220 may be adjusted in response to receiving new brightness settings. Further, in other embodiments where sections 134, 136, and 220 may have curved portions, the steepness of curved portions may be increased and/or decreased providing a relative slope change for the curved portions.

Figure 20:
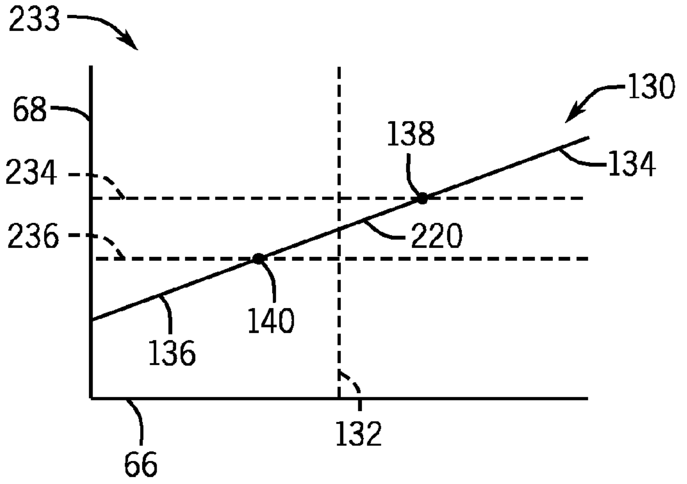
FIG. 20 is a chart illustrating adjustment thresholds on the profile of FIG. 17, in accordance with aspects of the present disclosure.
Figure 21:
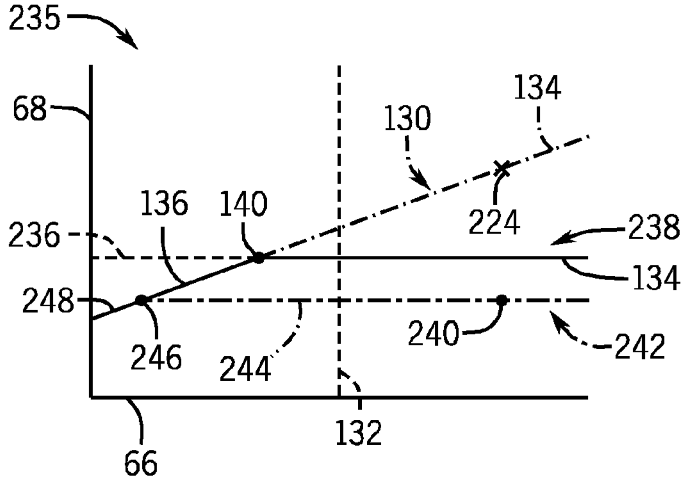
FIG. 21 is a chart depicting modified profiles for adjusting display brightness based on adjustment thresholds, in accordance with aspects of the present disclosure.
Figure 22:
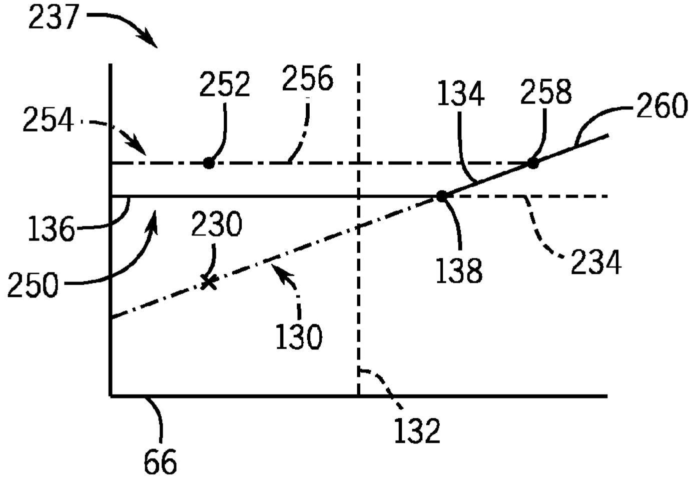
FIG. 22 is a chart depicting further modified profiles for adjusting display brightness based on adjustment thresholds, in accordance with aspects of the present disclosure.

In certain embodiments, rather than adjusting the slope to intersect with a new brightness setting, the slope may be adjusted to intersect with a maximum or minimum brightness level. For example, as shown in FIGS. 12 and 13, a portion of the adjustment profile may be clipped to intersect with the maximum or minimum brightness level as defined by the operational range of the backlight. Further, as shown in FIGS. 20 to 22 on charts 233, 235, and 237, transition points 138 and 140 may define a maximum brightness threshold 234 and a minimum brightness threshold 236, respectively, that may limit the amount of slope adjustments made to sections 134, 136, and 220. In particular, transition point 138 may define a maximum brightness threshold 234 that may be used when making adjustments to dim section 136, and transition point 140 may define a minimum brightness threshold 236 that may be used when making adjustments to bright section 134. According to certain embodiments, when a brightness setting is input by a user that is above or below one of the brightness thresholds 234 or 236, respectively, the corresponding section 136 or 134 may be adjusted to a minimum slope at the brightness threshold 234 or 236, rather than to the brightness setting input by the user. However, in other embodiments, the corresponding section 136 or 134 may be adjusted to the minimum slope at the point where the new brightness setting intersects the corresponding section 136 or 134.

FIG. 21 depicts a modified adjustment profile 238 where bright section 134 has been adjusted to minimum brightness threshold 236. In particular, a user has entered a new brightness setting 240 that would decrease the brightness from the current brightness 224 to the new brightness setting 240, which is below brightness threshold 236. Rather than adjusting bright section 134 to a level below brightness threshold 236, display controller 16 has created modified adjustment profile 238 where bright section 134 has a slope of zero and corresponds to brightness threshold 236. The use of minimum brightness threshold 236 may generally ensure that the display 12 does not decrease in brightness when a user moves display 12 from a dim area to a bright area.

In another embodiment, a new brightness setting that is below minimum brightness threshold 236 may produce a modified adjustment profile 242, shown by the dotted and dashed line. Modified adjustment profile 242 includes a portion 244 that has a slope of zero and intersects new brightness setting 240 and an intersection point 246 with dim section 136. Modified adjustment profile 242 also includes the portion 248 of dim section 136 that has a brightness level below the new brightness setting 240. According to certain embodiments, a user may be able to select which modified adjustment profile 238 or 242 should be used when minimum threshold 236 is exceeded. For example, a user may choose the type of minimum threshold adjustment that is made through a GUI of electronic device 10. However, in other embodiments, the type of minimum threshold adjustment that is employed may be set by a manufacturer or third party.

FIG. 22 illustrates a modified profile 250 where dim section 136 has been adjusted to maximum brightness threshold 234. In particular, a user has entered a new brightness setting 252 that would increase the brightness from the current brightness setting 230 to the new brightness setting 252, which is above brightness threshold 234. Rather than adjusting dim section 136 to a level above brightness threshold 234, display controller 16 has created modified profile 250 where dim section 136 has a slope of zero and corresponds to brightness threshold 234. The use of maximum brightness threshold 234 may generally ensure that display 12 does not increase in brightness when a user moves display 12 from a bright area to a dim area.

In another embodiment, a new brightness setting that is above maximum brightness threshold 234 may produce a modified adjustment profile 254, shown by the dotted and dashed line. Modified adjustment profile 254 includes a portion 256 that has a slope of zero and intersects new brightness setting 252 and an intersection point 258 with bright section 134. Modified adjustment profile 254 also includes the portion 260 of dim section 136 that has a brightness level above the new brightness setting 252. As noted above with respect to FIG. 21, a user may be able to select which modified profile 250 or 254 should be used when maximum threshold 234 is exceeded, or the type of adjustment that is made may be set by a manufacturer or third party.

Further, in certain embodiments, rather than setting portions of the slope of an adjustment profile to zero when a threshold 234 or 236 is exceeded, a minimum slope greater than zero may be employed. According to certain embodiments, employing a minimum slope greater than zero may ensure that display 12 appears responsive to user brightness adjustments. As discussed above with respect to FIGS. 14 and 15, in certain embodiments, the minimum slope may be a set value. However, in other embodiments, the minimum slope may vary as the ambient light level changes and/or as the display brightness changes.

Figure 23:
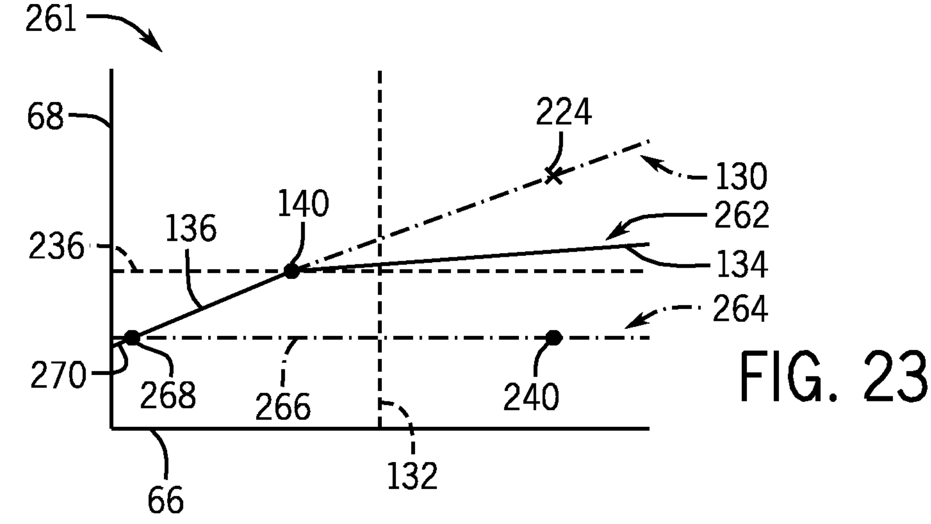
FIG. 23 is a chart depicting further modified profiles for adjusting display brightness based on adjustment thresholds, in accordance with aspects of the present disclosure.

FIG. 23 is a chart 261 of a modified adjustment profile 262 where bright section 134 has been adjusted to have a minimum slope in response to a user entering new brightness setting 240, which is below minimum brightness threshold 236. Rather than adjusting bright section 134 to a level below brightness threshold 236, display controller 16 has created modified adjustment profile 262 where bright section 134 extends from transition point 140 at the minimum slope. In another embodiment, a new brightness setting that is below minimum brightness threshold 236 may produce a modified adjustment profile 264, shown by the dotted and dashed line. Modified adjustment profile 264 includes a portion 266 that has a slope that corresponds to the minimum slope and intersects new brightness setting 240 and an intersection point 268 with dim section 136. Modified adjustment profile 264 also includes the portion 270 of dim section 136 that has a brightness level below intersection point 268.

Figure 24:
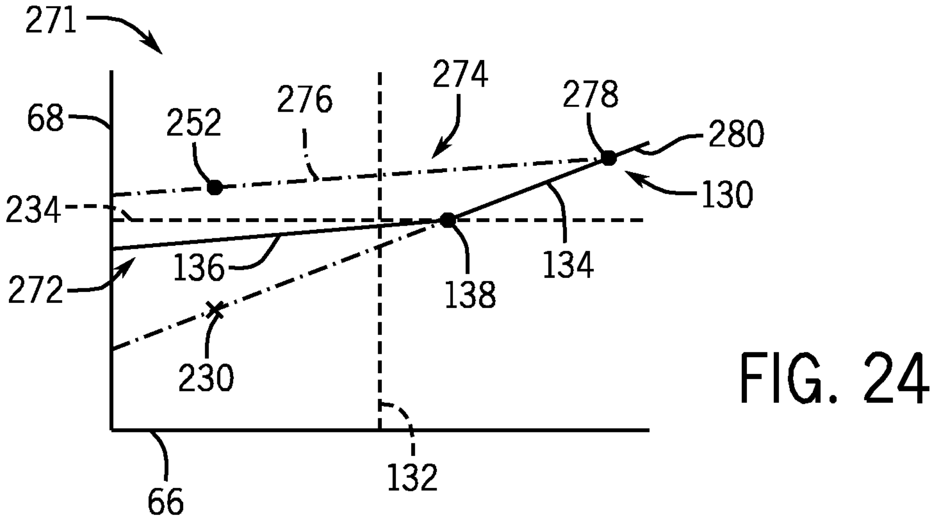
FIG. 24 is a chart depicting further modified profiles for adjusting display brightness based on adjustment thresholds, in accordance with aspects of the present disclosure.

FIG. 24 is a chart 271 of a modified adjustment profile 272 where dim section 136 has been adjusted to have a minimum slope in response to a user entering new brightness setting 252, which is above maximum brightness threshold 234. Rather than adjusting dim section 136 to a level above brightness threshold 234, display controller 16 has created modified adjustment profile 272 where bright section 134 extends from transition point 138 at the minimum slope. In another embodiment, a new brightness setting that is above maximum brightness threshold 234 may produce a modified adjustment profile 274, shown by the dotted and dashed line. Modified adjustment profile 274 includes a portion 276 that has a slope that corresponds to the minimum slope and intersects new brightness setting 252 and an intersection point 278 with bright section 134. Modified adjustment profile 274 also includes the portion 280 of bright section 134 that has a brightness level above intersection point 278.

Figure 25:
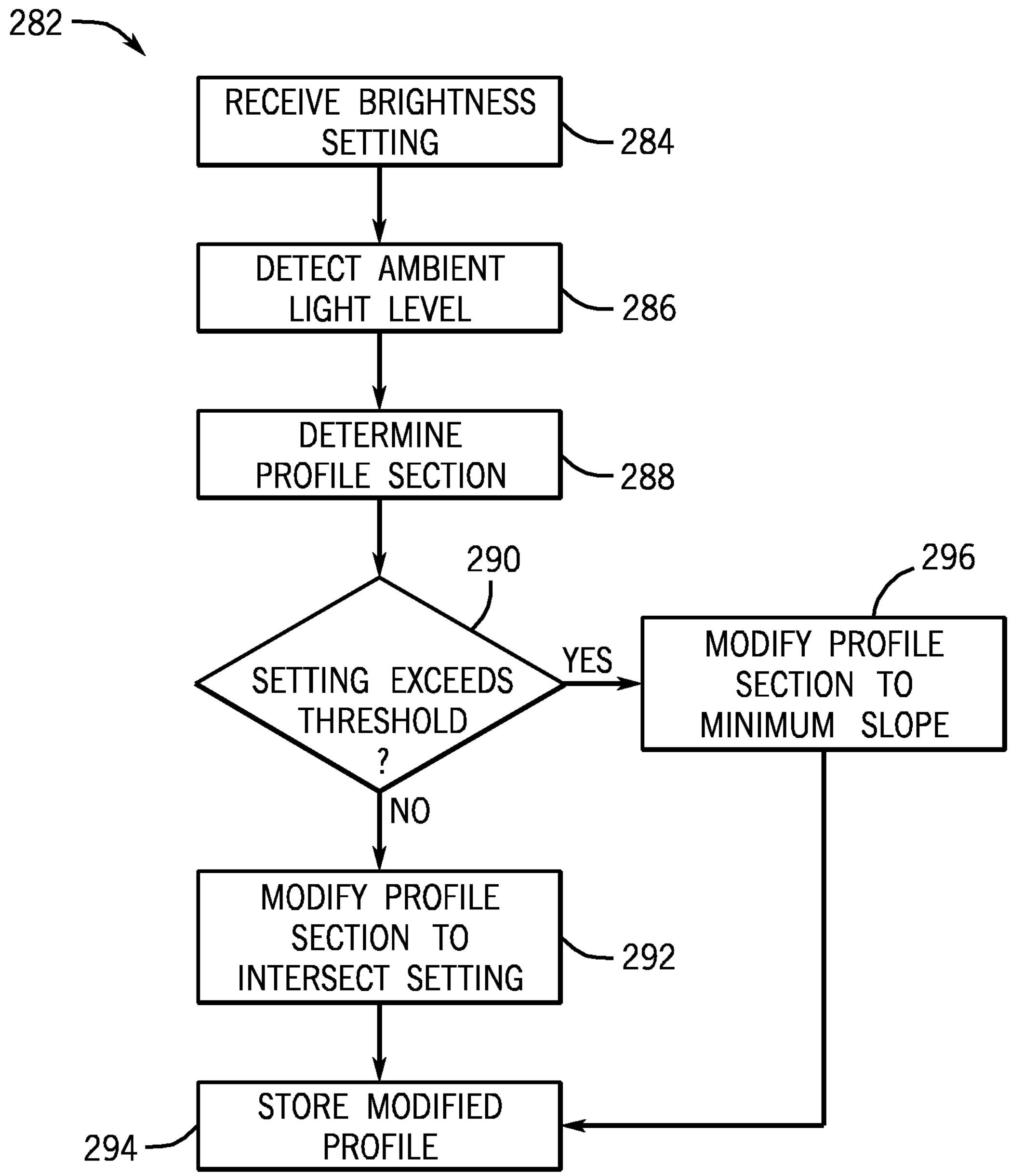
FIG. 25 is a flowchart depicting another embodiment of a method for modifying a profile for adjusting display brightness, in accordance with aspects of the present disclosure.

FIG. 25 depicts a method 282 for modifying a brightness adjustment profile where the bright and dim sections may be modified independently of one another. Method 282 may begin by receiving (block 284) a brightness setting. For example, as shown in FIG. 7, a user may adjust the brightness through a GUI 38 of electronic device 10. In response to receiving a brightness setting, electronic device 10 may detect (block 286) the current ambient light level. For example, electronic device 10 may measure the ambient light level through light sensor 20, as described above with respect to FIG. 1.

Based on the detected ambient light level, display controller 16 may determine (block 288) the section of the adjustment profile that corresponds to the detected ambient light level. For example, as shown in FIG. 17, display controller 16 may compare the detected ambient light level to the ambient light threshold 132. If the detected ambient light level is greater than ambient light threshold 132, display controller 16 may select bright section 134. On the other hand, if the detected ambient light level is below ambient light threshold 132, display controller 16 may select dim section 136. According to certain embodiments, display controller may use one or more algorithms and/or lookup tables to determine the section of the adjustment profile that corresponds to the detected ambient light level. Further, in certain embodiments, display controller 132 may retrieve ambient light threshold 132 from storage 28.

Display controller 16 may then determine (block 290) whether the received brightness setting exceeds a brightness threshold for the selected adjustment profile section. For example, if the selected section is bright section 134, display controller 16 may determine whether the brightness setting is less than brightness threshold 236 (FIG. 20). In another example, if the selected section is dim section 136, display controller 16 may determine whether the received brightness setting is greater than brightness threshold 234 (FIG. 20). According to certain embodiments, brightness thresholds 234 and 236 may be stored in storage 28.

If the brightness setting does not exceed the threshold, display controller 16 may then modify (block 292) the selected section to intersect with the new brightness setting and the corresponding transition point. For example, if the selected section if bright section 134, display controller 16 may use transition point 140 as the corresponding transition point, as shown in FIG. 18. In another example, if the selected section if dim section 136, display controller 16 may use transition point 138 as the corresponding transition point, as shown in FIG. 19. Display controller 16 may then adjust the slope of the selected section until the received brightness setting and the corresponding transition point intersect with the modified adjustment profile, for example, as shown in FIGS. 18 and 19. According to certain embodiments, display controller 16 may use one or more algorithms to adjust and/or calculate the new slope. The modified adjustment profile may then be stored (block 294). For example, display controller 16 may store the modified adjustment profile in storage 28 (FIG. 1) of electronic device 10.

On the other hand, if display controller 16 determines (block 290) that the received brightness setting exceeds the threshold, display controller 16 may modify (block 296) the selected section to have a minimum slope. For example, as shown in FIG. 21, if the received brightness setting 240 is below brightness threshold 236, display controller 16 may adjust bright section 134 to the brightness threshold 236, as illustrated by modified adjustment profile 238. In another embodiment shown in FIG. 21, if the received brightness setting 240 is below brightness threshold 236, display controller 16 may adjust a portion 244 of the profile to have a zero slope that intersects the received brightness setting 240, as illustrated by modified adjustment profile 242. FIG. 22 depicts similar examples where the received brightness setting 252 is above brightness threshold 236. For example, as shown in FIG. 22, if the received brightness setting 252 is above brightness threshold 234, display controller 16 may adjust dim section 136 to the brightness threshold 234, as illustrated by modified adjustment profile 250. In another embodiment shown in FIG. 22, if the received brightness setting 240 is above brightness threshold 234, display controller 16 may adjust a portion 256 of the profile to have a zero slope that intersects the received brightness setting 252, as illustrated by modified adjustment profile 254.

Further, in certain embodiments, the minimum slope may be greater than zero. For example, as shown in FIGS. 23 and 24, a minimum slope may be employed when a new brightness setting 224 is above brightness threshold 236 or below brightness threshold 234. In particular, display controller 16 may adjust a portion of the adjustment profile to have a minimum slope greater than zero. For example, as shown in FIG. 23, display controller 16 may adjust bright section 134 to have a minimum slope that intersects transition point 140, as illustrated by modified adjustment profile 262. In another embodiment shown in FIG. 23, display controller 16 may adjust a portion 266 of the profile to have a minimum slope that intersects with received brightness setting 240. As shown in FIG. 24, display controller 16 may adjust dim section 136 to have a minimum slope that intersects transition point 138, as illustrated by modified adjustment profile 272. In another embodiment shown in FIG. 24, display controller 16 may adjust a portion 276 of the profile to have a minimum slope that intersects with received brightness setting 252. Display controller 16 may then store (block 294) the modified profile.

Figure 26:
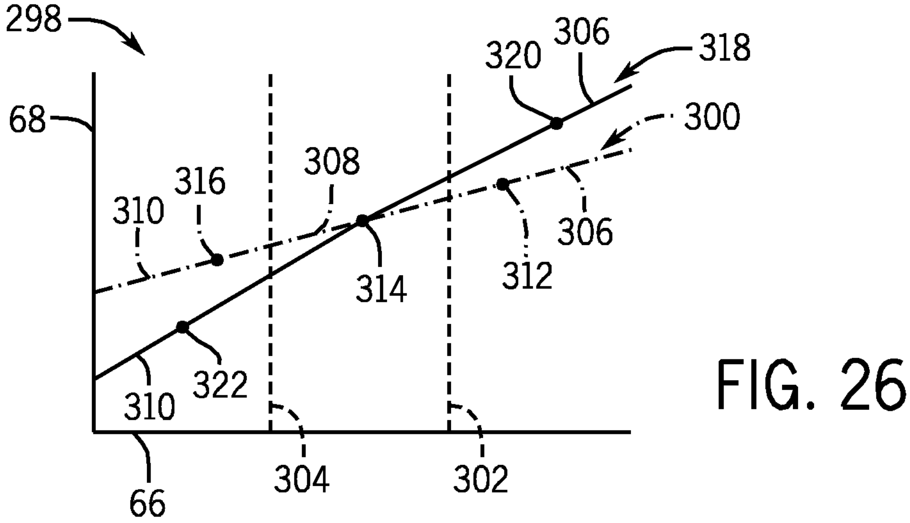
FIG. 26 is a chart depicting a profile for adjusting display brightness along with a modified profile for adjusting display brightness, in accordance with aspects of the present disclosure.

FIG. 26 depicts another embodiment of a chart 298 with a brightness adjustment profile 300 that may be used to change the brightness of display 12 as the ambient light level changes. Chart 298 includes two ambient light thresholds 302 and 304 that divide adjustment profile 300 (shown in the dashed lines) into three different sections 306, 308, and 310. In particular, bright section 306 includes ambient light levels above threshold 302; dim section 310 includes ambient light levels below threshold 304; and intermediate section 308 includes ambient light levels between ambient light thresholds 302 and 304. Each section 306, 308, and 310 also includes a transition point 312, 314, and 316 that may be employed to provide smooth transitions between each section 306, 308, and 310.

A user may adjust the brightness setting for display 12 when display 12 is located in environments having different ambient light levels. For example, in the illustrated embodiment, a modified profile 318 has been produced where two user adjustments were made in different ambient light levels. In particular, a user has entered a brightness setting 320 while display 12 was located in an environment with an ambient light level above ambient light threshold 302 and a user has entered a brightness setting 322 while display 12 was located in an environment with an ambient light level below ambient light threshold 304. In response to receiving brightness setting 320, the slope of bright section 306 has been increased so that bright section 306 now intersects transition point 314 and new brightness setting 320. In response to receiving brightness setting 322, the slope of dim section 310 has been increased so that dim section 310 now intersects transition point 314 and new brightness setting 322. Accordingly, transition point 314 may be employed as the transition point corresponding to both bright section 306 and dim section 310.

Figure 27:
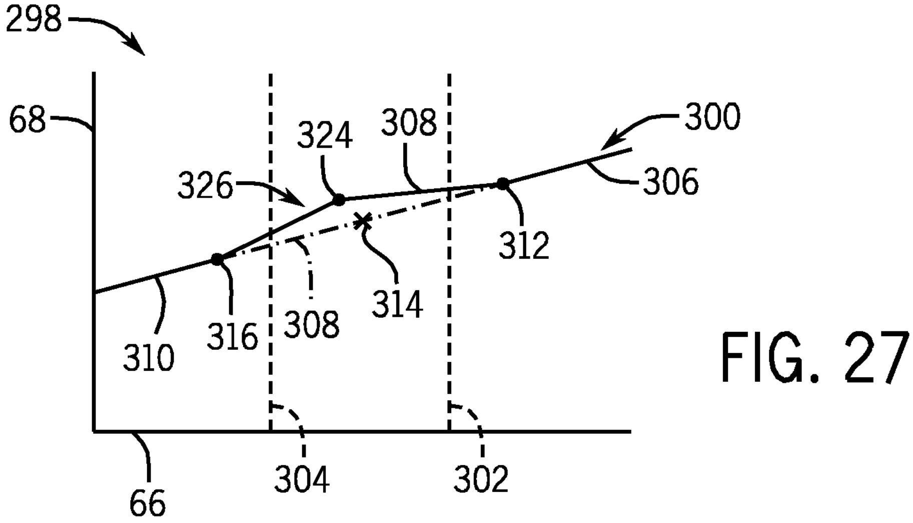
FIG. 27 is a chart depicting another modified profile for adjusting display brightness, in accordance with aspects of the present disclosure.

FIG. 27 depicts slope adjustments that may be made within intermediate section 308. In particular, a user has entered a new brightness setting 324 while display 12 was located in an area with an ambient light level greater than threshold 304 but less than threshold 302. In response to receiving the new brightness setting, intermediate section 308 has been changed in slope to produce a modified adjustment profile 326. In particular, the portion of intermediate section 308 to the right of new brightness setting 172 intersects with new brightness setting 172 and transition point 312 while the portion of intermediate section 308 to the left of new brightness setting 172 intersects with new brightness setting 172 and transition point 316. Accordingly, two transition points 312 and 316 may be employed as the transition points corresponding to intermediate section 308.

In other embodiments, any number of brightness settings may be entered by a user and employed by display controller 16 to modify the slope of one or more sections 306, 308, and 310 of an adjustment profile 300. Further, in other embodiments, any number of thresholds 302 and 304 may be employed to produce any number of sections that may be independently adjusted within a modified profile. Further, as noted above, rather than straight lines, each section may include one or more curved portions.

FIGS. 4 to 27 describe brightness adjustment profiles that may be employed by display controller 16 to modify the display brightness as the ambient light level changes. As discussed below with respect to FIGS. 28 and 29, display controller 16 also may determine the rate at which the brightness is adjusted using one or more adjustment rate profiles. According to certain embodiments, an adjustment rate profile may be designed to approximate the physiological adjustment of the human eye. For example, the human eye may adapt to dimmer conditions more slowly than the human eye adapts to bright conditions. Accordingly, the adjustment rate profile may be designed to dim the display relatively slowly and brighten the display relatively quickly. Further, in certain embodiments, the adjustment rate profile may be designed to adjust the display at a rate that is substantially equal to the physiological adjustment rate of the human eye. According to certain embodiments, the adjustment rate profile may be designed to take approximately 10 seconds to reduce the brightness by a factor of 10, approximately 5 seconds to reduce the brightness by a factor of 3, and approximately 5 seconds to reduce the brightness by a factor of 1.5. Further, according to certain embodiments, the adjustment rate profile may be designed to take approximately 5 seconds to increase the brightness by a factor of 1.5 and approximately 1 to 2 seconds to increase the brightness by a factor of 2 or more. However, in other embodiments, the specific length of time for reducing the brightness may vary based on factors such as the type and/or size of the display.

Figure 28:
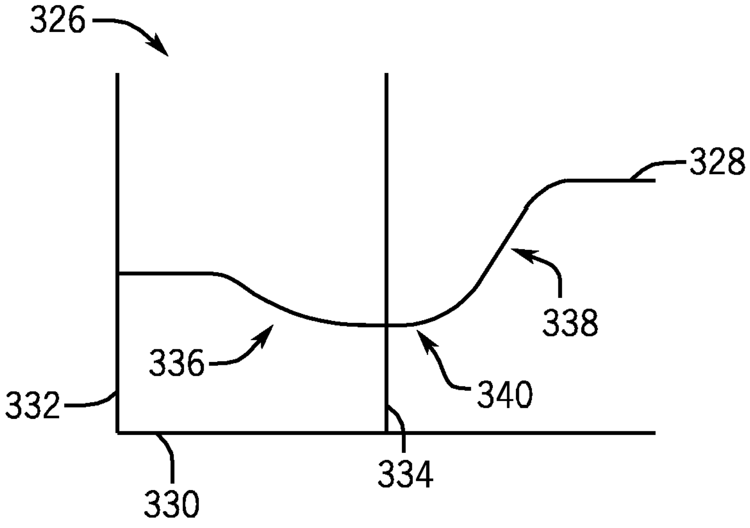
FIG. 28 is a chart depicting a profile for determining a brightness adjustment rate, in accordance with aspects of the present disclosure.

FIG. 28 is a chart 326 depicting an embodiment of an adjustment rate profile 328. Chart 326 includes an x-axis 330 that shows the magnitude of change in the display brightness (or, in other embodiments, the magnitude of change in the ambient light level) and a y-axis 332 that shows the adjustment rate for changing the brightness of display 12. The current display brightness setting may be represented as a line 334 that indicates zero deviation from the current display brightness setting. According to certain embodiments, the magnitude of change shown on x-axis 330 may represent the ratio or percentage of change in the current display brightness, and the rate of change shown on y-axis 332 may represent the ratio of change in the current display brightness divided by the time constant (i.e., the time it takes to complete the change). In certain embodiments, the time constant may vary based on the magnitude of change. For example, in certain embodiments, the time constant may decrease as the magnitude of change increases.

As shown, adjustment rate profile 328 is asymmetrical. In particular, adjustment rate profile 328 includes a relatively shallow curved section 336 for dimming the display at a relatively slow rate and includes a steeper section 338 for brightening the display at a faster rate. Consequently, it may take longer to reduce the brightness than it takes to increase the brightness. As noted above, the time it takes to complete a brightness change may be represented by a time constant. In certain embodiments, the following time constants (i.e. the time it takes to complete the brightness change) may be employed: a time constant of approximately 8 seconds may be used to reduce the brightness by one-fifth; a time constant of approximately 12 seconds may be used to reduce the brightness by two-thirds, one-half, and one-fourth; a time constant of approximately 10 seconds may be used to increase the brightness by one-third; a time constant of approximately 6 seconds may be used to increase the brightness by one-half; a time constant of approximately 2 seconds may be used double the brightness; and a time constant of approximately 1.4 seconds may be used to triple the brightness. According to certain embodiments, shallow curved section 336 may be designed to approximate the physiological response of the human eye, which adjusts relatively slowly to decreased lighting. Similarly, steeper section 338 may be designed to approximate the physiological response of the human eye, which adjusts relatively quickly to increased lighting. According to certain embodiments, an asymmetry of about one order of magnitude may exist between the rate of change for shallow curved section 336 and the rate of change for steeper section 338. Further, in certain embodiments, the adjustment rate profile 328 may be designed to provide a rate of change that ranges from approximately equal to or twice as fast as the physiological response of the human eye. However, in other embodiments, the particular curvatures and/or the relative steepness of sections 338 and 340 may vary.

Adjustment rate profile 328 also includes a relatively flat section 340 that provides a fairly slow rate of change for small changes in brightness. When the magnitude of change in brightness is relatively small, for example, less than approximately one-third of the current brightness setting, a relatively slow rate of change may be used to adjust the display, regardless of the direction of change. Further, the same rate of change may be employed for small magnitudes of change in the brightness. In other embodiments, the same time constant may be employed for small magnitudes of change in the brightness. In other words, it may take approximately the same amount of time to complete a brightness change that is smaller than a certain amount. For example, in certain embodiments, it may take the same amount of time to adjust the display to a new brightness that is between approximately one third less than the current brightness and one third greater than the current brightness. According to certain embodiments, a time constant of approximately 6 to 12 seconds may be employed for small magnitudes of change in the brightness. In certain embodiments, the relatively slow rate of change and/or the consistent time constant for small brightness changes may promote robust and smooth changes in brightness during sudden moderate changes in ambient light levels.

Figure 29:
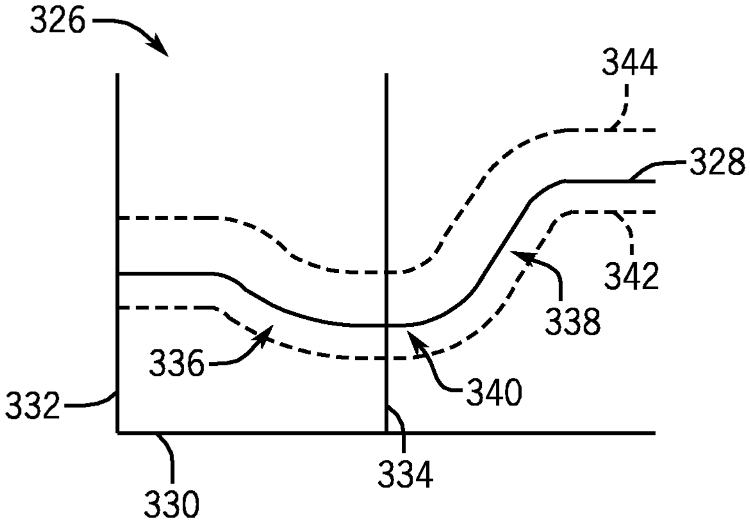
FIG. 29 is a chart depicting modified profiles for determining a brightness adjustment rate, in accordance with aspects of the present disclosure.

FIG. 29 depicts an embodiment where display controller 16 may modify the adjustment rate profile in response to a user input. For example, as shown in FIGS. 3 and 7, a user may move graphical element 56 to the right or left to increase or decrease the rate of the brightness adjustment. Accordingly, movement of graphical element 56 may scale an adjustment profile up or down. In particular, as shown in FIGS. 3 and 7, a user may move graphical element 56 to the left to decrease the rate of the brightness adjustment. In response to the user input, display controller 16 (FIG. 1) may move the adjustment rate profile 328 down to produce a modified adjustment rate profile 342 that has a relatively slower rate of response when compared to adjustment rate profile 328. In another example, a user may move graphical element 56 to the right to increase the rate of the brightness adjustment. In response to the user input, display controller 16 (FIG. 1) may move adjustment rate profile 328 up to produce a modified adjustment rate profile 344 that has a relatively quicker rate of response when compared to adjustment rate profile 328.

As shown in FIGS. 3 and 7, GUI 38 includes a single graphical element 56 that may be adjusted by a user to increase or decrease the response rate. However, in other embodiments, two or more graphical elements 56 may be included in GUI 38 that allow a user to set different adjustment rate profiles for different ambient light levels. For example, one graphical element 56 may be used to adjust the rate for a dim section 136 (FIG. 8) of brightness adjustment profile 130, while another graphical element may be used to adjust the rate for a bright section 134 (FIG. 8) of brightness adjustment profile 130.

Figure 30:
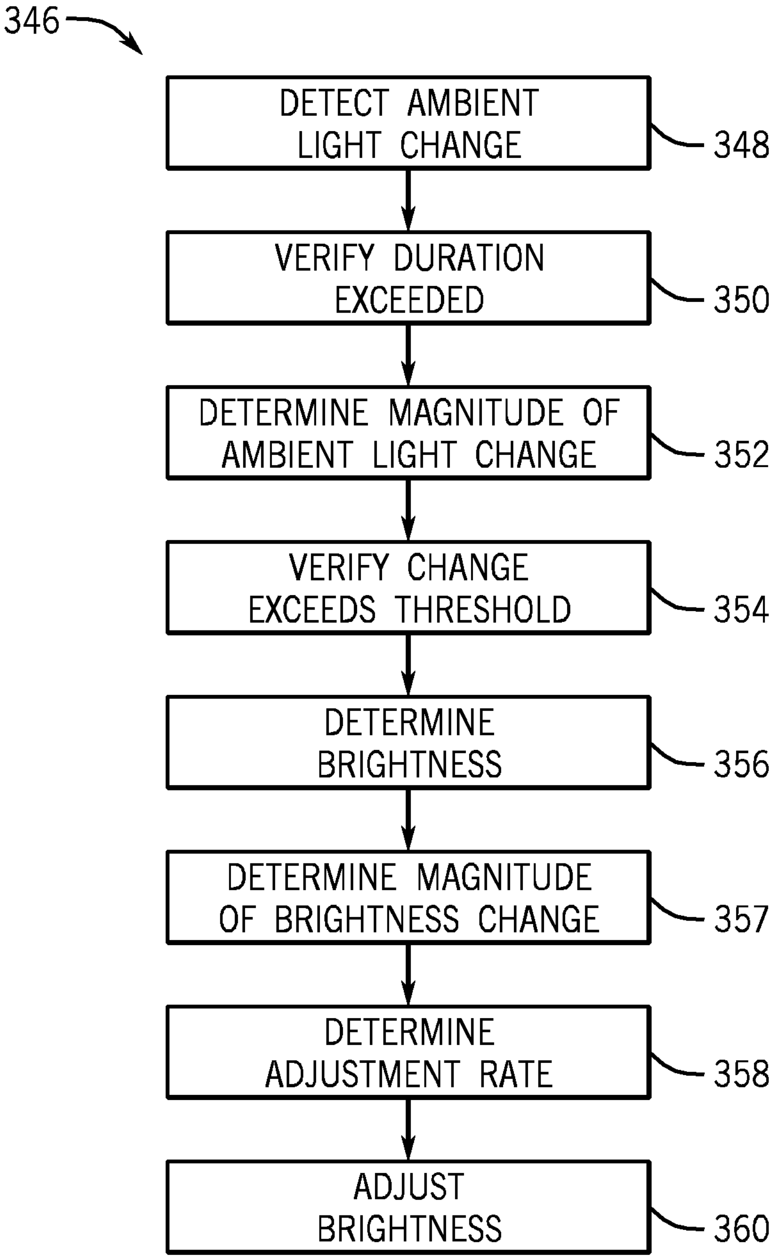
FIG. 30 is a flowchart depicting a method for adjusting display brightness using an adjustment rate, in accordance with aspects of the present disclosure.

FIG. 30 depicts a method 346 for adjusting the display brightness based on a response rate. Method 346 may begin by detecting (block 348) a change in the ambient light level. For example, light sensor 20 (FIG. 1) may detect the current ambient light level. Display controller 16 may then compare the current light level to the previously measured ambient light level to detect a change in the ambient light level.

Display controller 16 may then verify (block 350) that the change in the ambient light level has exceeded a set duration. For example, the duration may include a period of time, such as 1 second, 5 seconds, 10 seconds, or 30 seconds, that may be exceeded before an adjustment is made to the brightness of display 12. According to certain embodiments, the duration may be stored within storage 28. In certain embodiments, the duration may be set to zero or may be a fraction of a second, such as one-tenth or one-twentieth of a second. Moreover, in certain embodiments, the duration may be adjusted by a user through a GUI. According to certain embodiments, the duration verification may ensure that the display brightness does not change rapidly when a user is moving through an area of changing ambient light conditions. For example, a user may be walking through a hallway with light sources disposed at various intervals and may not wish for the brightness to change as the user passes each individual light source.

Once the duration has been exceeded, display controller 16 may then determine (block 352) the magnitude of change in the ambient light level. For example, display controller 16 may compare the new ambient light level to a previously measured ambient light level to determine the direction of the change and calculate the amount of change in the ambient light level. In certain embodiments, the previously measured ambient light level may be the most recent previously detected ambient light level. However, in other embodiments, the previously measured ambient light level may correspond to the last ambient light level that was used by display controller 16 to make a brightness adjustment.

In certain embodiments, display controller 16 may set the newly detected ambient light level to a threshold amount if the detected ambient light level is below a minimum ambient light level or above a maximum ambient light level. For example, in certain embodiments, the operational range of the ambient light sensor may be approximately 1 to 50,000 lux, or more specifically, approximately 6 to 6,000 lux. In these embodiments, if the detected ambient light level if below 6 lux, display controller 16 may set the detected level to 6 lux. Similarly, if the detected ambient light level is above 6,000 lux, display controller 16 may set the detected level to 6,000 lux. However, in other embodiments, the maximum and minimum threshold values may vary depending on factors, such as the type ambient light sensor, the saturation point for the ambient light sensor, and/or the resolution requirements at low ambient light levels, among others. In these embodiments, the threshold value may be employed as the newly detected ambient light level. Further, in other embodiments, display controller 16 may ignore ambient light levels that are detected outside of the operational range of the ambient light sensor.

Display controller 16 may then verify (block 354) that the magnitude of change exceeds a threshold amount. In particular, the threshold amount specifies the minimum amount of change that should occur in the ambient light level in order to adjust the display brightness. If the threshold amount is not met, no brightness adjustment may be made, which may reduce fluctuation of the display brightness. In certain embodiments, the threshold amount may be a percentage of the current or previously measured ambient light level. For example, the threshold amount may be approximately 5 to 10 percent of the previously measured ambient light level. Further, in certain embodiments, the range of ambient light sensor 20 (FIG. 1) may be divided into a series of steps or increments. For example, in certain embodiments, the step size may be approximately 0.1 to 1 lux, or more specifically, approximately 0.3 lux at low ambient light levels. In these embodiments, the threshold amount may be based on exceeding a number of steps. For example, in certain embodiments, the threshold amount may be 1 or 2 steps. In this example, the magnitude of change would exceed the threshold amount if the new ambient light level is at least two steps above or below the previously measured ambient light level. In yet other embodiments, the ambient light levels detected by the sensor may be directed to display controller 16 through an analog to digital (A/D) converter. In these embodiments, the threshold amount may be based on the count values provided by the A/D converter. According to certain embodiments, the threshold verification may reduce frequent brightness changes when the ambient light level is fluctuating by small amounts.

After verifying (block 354) that the ambient light change exceeds or meets the threshold, display controller 16 may determine (block 356) the new brightness setting based on the detected ambient light level. For example, display controller 16 may use a brightness adjustment profile, such as brightness adjustment profile 62 (FIG. 4), 130 (FIGS. 8 and 17), or 300 (FIG. 26) to calculate the new brightness setting for the detected ambient light level. Display controller 16 may then determine (block 357) the change in the brightness. For example, display controller may compare the new brightness setting to current brightness level to determine the direction and amount of the change in the brightness level.

Based on the change in the brightness, display controller 16 may determine (block 358) the rate of response that should be employed to adjust the brightness. For example, display controller 16 may use an adjustment rate profile, such as adjustment rate profile 328 shown in FIG. 28, to determine the adjustment rate based on the change in the brightness level. In certain embodiments, display controller 16 may use adjustment rate profile 328 to determine an adjustment rate that corresponds to the magnitude and direction of change in the brightness. In other embodiments, display controller 16 may determine a time constant (i.e. how long it should take to complete the brightness change) based on the magnitude and the direction of change. For example, display controller 16 may use algorithms or look up tables to select and/or determine the time constant based on the change in brightness. Display controller 16 may then use the selected time constant to determine the rate of change. As discussed above with respect to FIG. 28, the adjustment rate may depend on both the direction of change and the amount of change. For example, a higher rate may be employed to increase the brightness than is used to reduce the brightness. Further, in certain embodiments, for relatively small changes in brightness, a set time constant or rate of change may be employed, regardless of the direction of the change. After the brightness has been determined, display controller 16 may then adjust (block 360) the brightness. For example, display controller 16 may vary the current or voltage supplied to backlight 14 to set the brightness to the determined brightness setting.

As described above with respect to FIG. 30, display controller 16 may verify (block 354) that the amount of change in ambient light exceeds a certain threshold prior to making a brightness change. According to certain embodiments, the threshold may be a set amount of change in an ambient light level, a step size, or a count level, or may be based on a percentage of the ambient light level. Further, as described below with respect to FIG. 31, in certain embodiments, the threshold for making a brightness adjustment may be selected based on whether display controller 16 is currently making a brightness adjustment. According to certain embodiments, display controller 16 may select between a threshold amount of change in the ambient light level and a threshold amount of change in the brightness. For example, a threshold amount of change in the ambient light level may be employed when the backlight is currently transitioning to a new brightness level, while a threshold amount of change in the brightness may be employed when the backlight is operating at a steady brightness level. According to certain embodiments, employing different thresholds depending on the operational state of the backlight may inhibit interruption of a current brightness adjustment. For example, employing an ambient light threshold during current brightness changes may ensure that a large enough ambient light level change is detected, for example 15 to 20 percent, before interrupting a current brightness change. The ambient light threshold may be particularly useful during longer adjustment periods, such as dimming of the backlight, which may take approximately 5 to 30 seconds, or longer.

Figure 31:
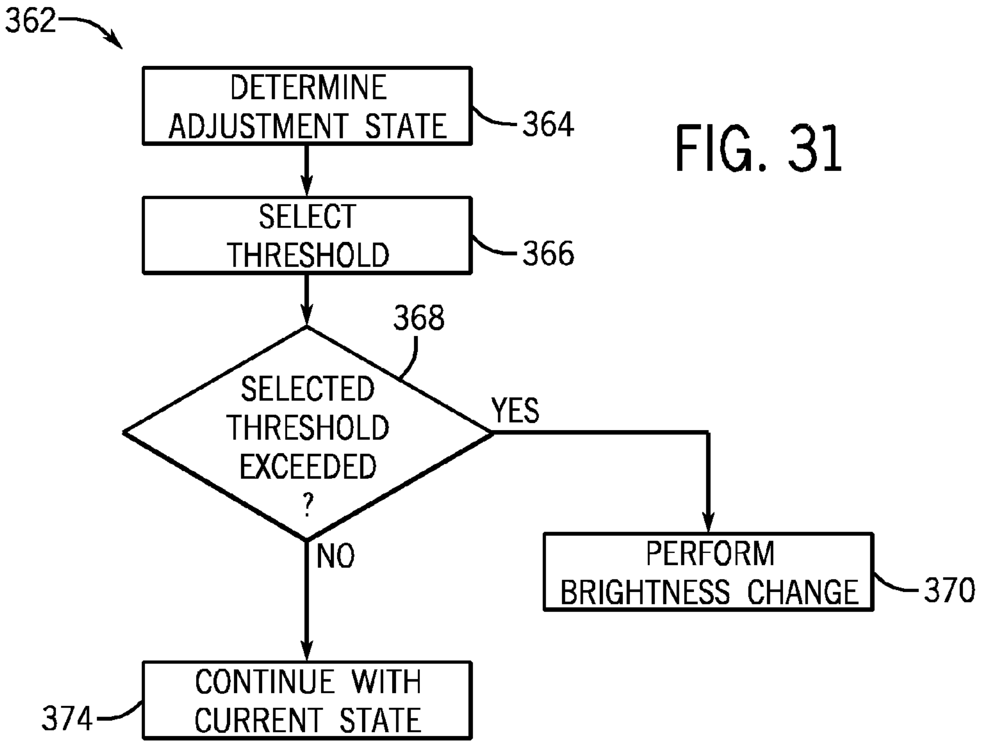
FIG. 31 is a flowchart depicting a method for verifying that an ambient light change exceeds a threshold, in accordance with aspects of the present disclosure.

FIG. 31 depicts an embodiment of a method 362 for verifying whether a brightness change should be made. Method 362 may begin by determining (block 364) the state of the brightness adjustment. For example, display controller 16 may determine whether a brightness adjustment is currently being conducted or whether the brightness is at steady state.

Display controller 16 may then select (block 366) a threshold based on the adjustment state. For example, display controller 16 may select between an ambient light threshold and a brightness threshold. The ambient light threshold specifies a minimum amount of change between the newly detected ambient light level and a previous ambient light level, while the brightness threshold specifies a minimum amount of change between the current brightness and a target brightness that corresponds to the newly detected ambient light level. The ambient light threshold may be selected if a brightness adjustment is in progress, while the brightness threshold may be selected if no brightness adjustment is in progress.

Display controller 16 may then determine (block 368) whether the selected threshold has been exceeded. For example, display controller 16 may determine an amount of change that corresponds to the selected threshold. In particular, the threshold amount of change specifies a minimum amount of change that is needed to perform a brightness adjustment. According to certain embodiments, display controller 16 may determine the threshold amount based on one or more algorithms, lookup tables, or the like. Further, in certain embodiments, display controller 16 may retrieve the selected threshold amount from storage 28.

Display controller 16 may then compare the current change to the threshold amount to determine (block 368) whether the selected threshold has been exceeded. For example, when the ambient light threshold is selected, display controller 16 may compare the newly detected ambient light level to a previously detected ambient light level to determine the current change. In certain embodiments, the previously detected ambient light level may be the most recent previously detected ambient light level. However, in other embodiments, the previously measured ambient light level may correspond to the last ambient light level that was used by display controller 16 to make a brightness adjustment. When the brightness threshold is selected, display controller 16 may compare the current brightness setting to a target brightness setting that corresponds to the newly detected ambient light level to determine the current change. For example, display controller 16 may employ a brightness adjustment profile 130 (FIG. 8) to determine the target brightness setting.

Display controller 16 may then determine whether the current change exceeds the threshold amount of change. For example, display controller 16 may compare the change in the ambient light level or the brightness to the selected ambient light threshold amount of change or brightness threshold amount of change, respectively. According to certain embodiments, the ambient light threshold amount of change may be approximately 15 to 20 percent of the current ambient light level. Further, according to certain embodiments, the brightness threshold amount may be approximately 10 percent of the current brightness. If the change exceeds the selected threshold amount, display controller 16 may then perform (block 370) a change to the display brightness based on the detected ambient light level. For example, display controller may determine (block 356) the adjustment rate, determine (block 358) the new brightness level, and then adjust (block 360) the display brightness, as described above with respect to FIG. 30.

On the other hand, if display controller 16 determines (block 368) that the selected threshold is not exceeded, display controller 16 may continue (block 374) with its current state of operation. For example, if a brightness adjustment was in progress prior to detecting a new ambient light level, display controller 16 may continue to make the present brightness adjustment. If no brightness adjustment was in progress, display controller 16 may continue to operate the display at the present brightness level.

In addition to, or instead of, adjusting the brightness based on detected ambient light levels, electronic device 10 may adjust the brightness of display 12 based on the angular incidence of ambient light hitting display 12. In certain embodiments, as described below with respect to FIG. 33, electronic device 10 may include one or more ambient light sensors designed to compensate for the angular incidence of ambient light hitting display 12. In these embodiments, the ambient light sensors may perceive the ambient light levels differently depending on the angular incidence of the ambient light. In other embodiments, as described below with respect to FIGS. 34 to 35, electronic device 10 may detect the angle of incidence of the ambient light and may adjust the received ambient light level to compensate for the angle of incidence of the ambient light.

Figure 32:
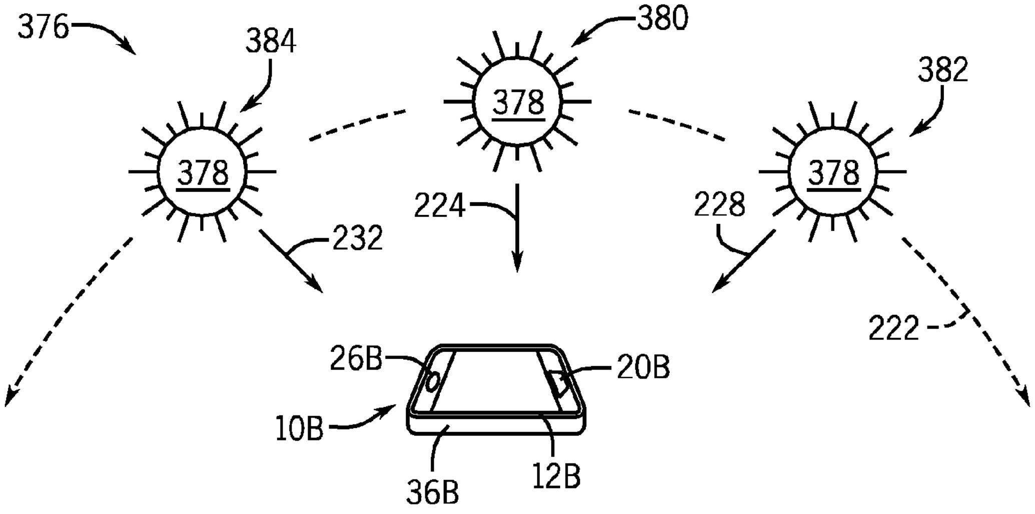
FIG. 32 is a schematic diagram of an environment where an electronic device may be used, in accordance with aspects of the present disclosure.

FIG. 32 depicts an environment 376 where an electronic device 10 may be employed. For example, environment 376 may include an electronic device 10B, shown here as a multifunctional media player. According to certain embodiments, electronic device 10B may be a model of an iPhone® available from Apple Inc. However, in other embodiments, the electronic device may be a laptop computer, such as electronic device 10A shown in FIG. 2, or any other suitable electronic device.

Environment 376 also includes an ambient light source 378. Ambient light source 378 may provide ambient light for viewing electronic device 10B and its associated display 12B. One or more light sensors 20B within electronic device 10B may detect the angle of ambient light from ambient light source 378. Ambient light source 378 may be moved between positions 380, 382, and 384, as generally indicated by an arrow 222. According to certain embodiments, ambient light source 378 may be any suitable ambient light source, such as the sun, a lamp, or a flashlight, among others.

In the first position 380, ambient light source 378 may direct light towards display 12B in a first direction 224, which may correspond generally to an angle of incidence of 0°. Ambient light source 378 and/or electronic device 10B may be moved with respect to one another to change the position 380 and the angle of incidence of the ambient light source 378 with respect to display 12B of electronic device 10B. For example, in the second position 382, light source 378 may direct light towards display 12B in a direction 228, which may correspond to an angle of incidence of approximately 45°. In another example, in the third position 384, light source 378 may direct light towards display 12B in a third direction 232, which may correspond to an angle of incidence of approximately −45°. In certain embodiments, light sensor 20B within electronic device 10B may perceive the ambient light level differently depending on the angle of incidence 226, 230, or 234. In other embodiments, light sensor 20B may be designed to detect the angle of incidence 226, 230, or 234 and the actual ambient light level. In these embodiments, electronic device 10B may employ one or more angular adjustment profiles to adjust the detected ambient light level based on the detected angle of incidence.

Figure 33:
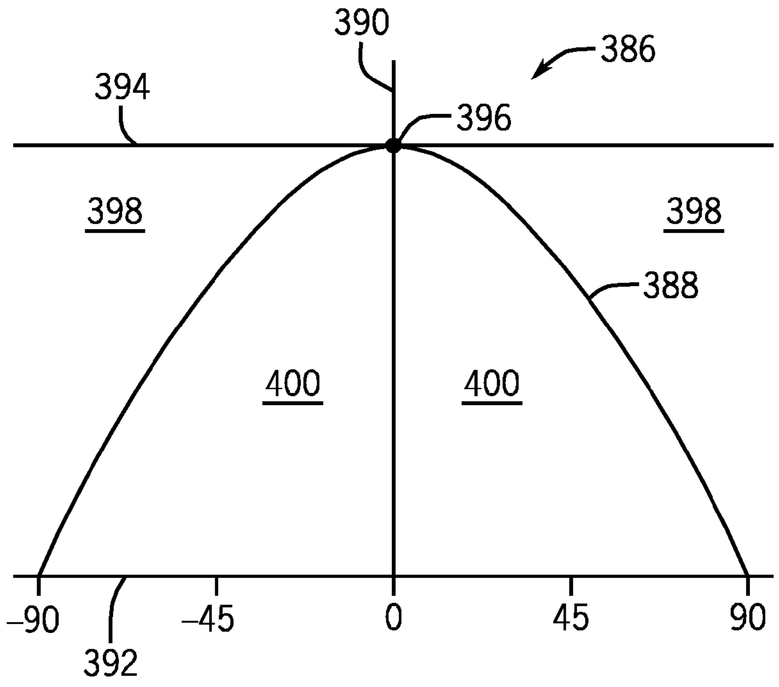
FIG. 33 is a chart depicting a response profile for an ambient light sensor, in accordance with aspects of the present disclosure.

FIG. 33 is a chart 386 depicting an embodiment of a response profile 388 for an ambient light sensor designed to perceive ambient light levels differently based on the angle of incidence of the ambient light. Chart 386 includes an x-axis 390 that represents the angle of incidence of ambient light source 378 (FIG. 32). Chart 236 also includes a y-axis 392 that represents the ambient light level. Line 394 represents the actual ambient light level emitted by ambient light source 378, for example, as may be measured by a lux meter. As shown on chart 386, the actual ambient light level, represented by straight line 394, remains constant as the angle of incidence of ambient light source 378 changes.

Response profile 388 represents the ambient light level perceived by ambient light sensor 20. As shown, response profile 388 is a symmetrical curve about point 396 where line 394 intersects response profile 388. Point 396 is located along x-axis 392 at 0°. Accordingly, when the angle of incidence of the ambient light source is 0°, the perceived ambient light level may be approximately equal to the actual ambient light level. As shown, response profile 388 generally corresponds to a cosine curve, which as may be appreciated by those skilled in the art, may model the reflection of ambient light off of flat surfaces in the real world. Accordingly, the perceived ambient light level may be approximately equal to the actual ambient light level multiplied by the cosine of the angle of incidence. The perceived ambient light levels, represented by response profile 388, may be provided to display controller 16 and used to adjust the brightness of display 12 based on ambient light levels, as described above with respect to FIGS. 3 to 30. Accordingly, by designing ambient light sensor 20 to perceive ambient light levels in accordance with a cosine curve, the brightness of the display may be adjusted in a manner that models the reflective behavior of physical surfaces.

Line 394 and response profile 388 divide chart 386 into area 398 located between line 394 and response profile 388 and an area 400 located between response profile 388 and x-axis 392. In other embodiments, the curvature of response profile 388 may widen until response profile 388 approaches line 394. In particular, the curvature of response profile 388 may be modified so that response profile 388 is disposed anywhere in area 398 up to and along line 394.

As may be appreciated by those skilled in the art, optical elements may be employed to design ambient light sensor 20 to produce response profile 388. For example, in certain embodiments, ambient light sensor 20 may include optical elements, such as a diffuser cover, a light window, and/or a fiber optic light pipe, among others. The shape, size, geometry, and/or structural materials of these elements may be varied to produce the desired response profile 388.

In other embodiments, rather than designing ambient light sensor 20 to perceive ambient light different based on the angle of incidence of the ambient light source, ambient light sensor 20 may be designed to detect the actual ambient light level. In these embodiments, display controller 16 may be designed to apply an adjustment to the actual ambient light level to account for the angle of incidence using one or more angular adjustment profiles.

Figure 34:
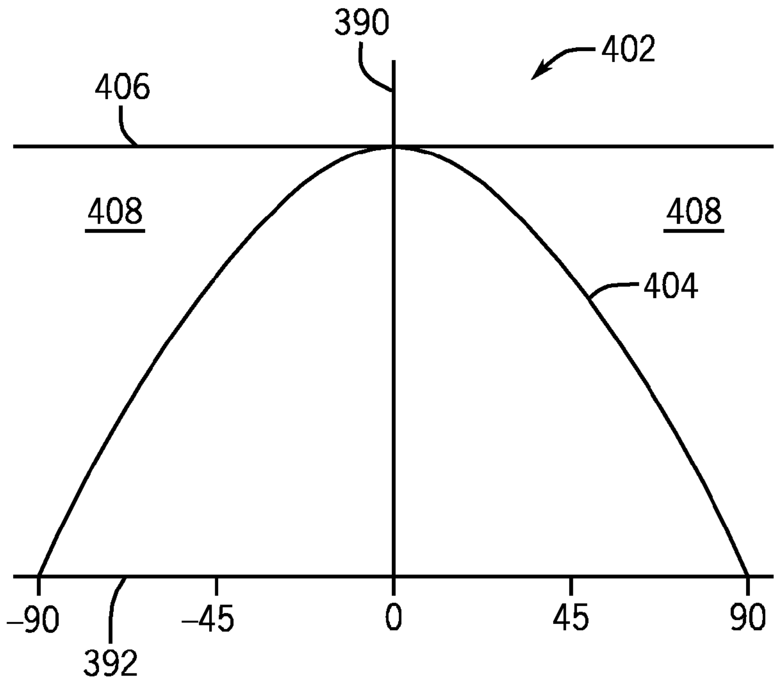
FIG. 34 is a chart depicting an angular adjustment profile for determining a brightness adjustment based on an angle of ambient light, in accordance with aspects of the present disclosure.

FIG. 34 is a chart 402 depicting an embodiment of an angular adjustment profile 404 for modifying the detected ambient light level based on the angle of incidence of an ambient light source. Line 406 represents the ambient light level perceived by ambient light sensor 20, which, as may be seen by comparing FIGS. 33 and 34, is approximately equal to the actual ambient light level 394 (FIG. 33). Angular adjustment profile 404 represents an adjustment that may be made to the ambient light level detected by light sensor 20 (FIG. 1). In particular, the detected ambient light level, represented by line 406, may be multiplied by the cosine of the detected angle of incidence to produce angular adjustment profile 404. The adjusted ambient light level, corresponding to angular adjustment profile 404, may then be used to determine a brightness level using a brightness adjustment profile as described above with respect to FIGS. 3 to 31.

As shown in FIG. 34, angular adjustment profile 404 generally corresponds to a cosine curve, and accordingly, may model the reflection of ambient light off of flat surfaces in the real world. In other embodiments, the curve of angular adjustment profile 404 may be widened. For example, angular adjustment profile 404 may be widened until angular adjustment profile approaches line 406. In particular, the curvature of response profile 404 may be modified so that angular adjustment profile 404 is disposed anywhere in area 408, which is defined as the space between angular adjustment profile 404 and line 406. According to certain embodiments, angular adjustment profile 404 may be designed to simulate the reflectivity of a hard copy material, as described above with respect to FIG. 7. For example, the shape of angular adjustment profile 404 may be designed to simulate the reflectivity of a book or a newspaper, which may be selected by a user through graphical elements 114 and 116, respectively.

Angular adjustment profile 404 also may be employed to adjust ambient light levels detected from multiple ambient light sources. In these embodiments, the ambient light levels from each light source may be weighted based on their relative brightness and adjusted using one or more angular adjustment profiles. The adjusted ambient light levels may be then combined to determine a total adjustment ambient light level, which may be used to determine the brightness for display 12, as described above with respect to FIGS. 3 to 31. Further, in other embodiments, rather than determining an adjusted ambient light level that can be used to determine a brightness for the display, the display brightness may first be determined using the actual ambient light level, for example, as shown in FIG. 34 by line 406. An adjustment profile may then be used to modify the determined brightness level to account for the angle of incidence of the ambient light source.

Figure 35:
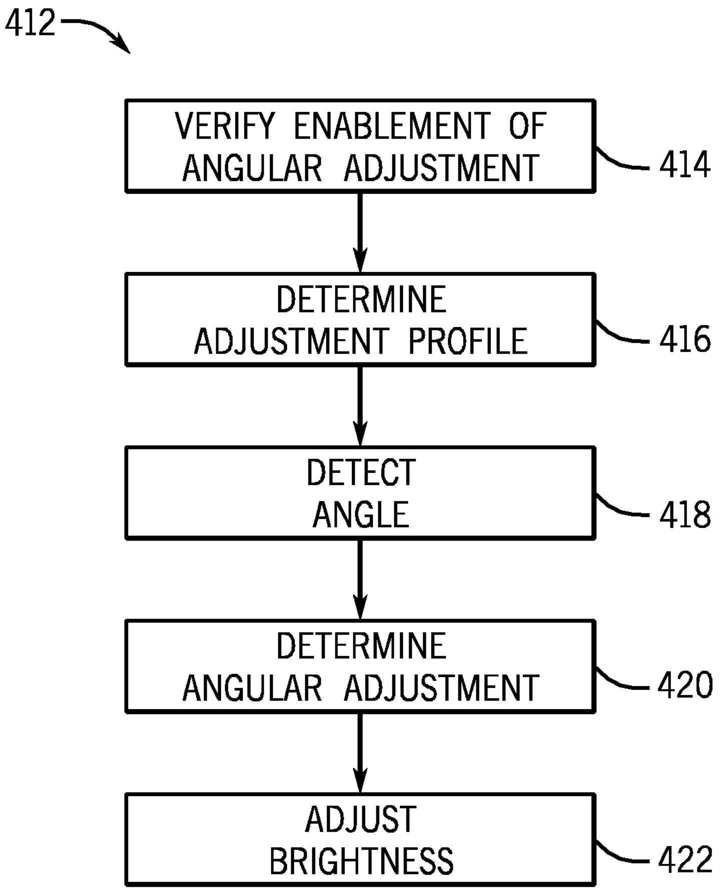
FIG. 35 is a flowchart depicting a method for adjusting display brightness based on an angle of ambient light, in accordance with aspects of the present disclosure.

FIG. 35 depicts a method 412 for adjusting the brightness of a display based on an angle of incidence of an ambient light source. Method 412 may begin by verifying (block 414) enablement of the angular adjustment. For example, as shown in FIG. 7, a user may check box 124 to disable an angular adjustment. If box 124 is unchecked, the angular adjustment may be enabled. Display controller 16 may then determine (block 416) the appropriate angular adjustment profile to use in making the angular adjustment. For example, processor 18 may provide a signal to display controller 16 indicating that graphical element 114 or 116 (FIG. 7) was selected by a user through GUI 38. Display controller 16 may then retrieve the appropriate reflectivity adjustment profile 404 associated with the user input.

Electronic device 10 may then detect (block 418) the angle of incidence of the ambient light source. For example, as shown in FIG. 32, when ambient light source 378 is in the second position 382, electronic device 10 may detect that the angle of incidence is approximately 45°. According to certain embodiments, ambient light sensor 20 may include an array of sensors mapped on a spherical surface that are designed to detect the distribution of ambient light. The distribution information from ambient light sensor 20 may be provided to display controller 16 to determine the angle of incidence of the ambient light. In another example, ambient light sensor 20 may be used in conjunction with camera 27 (FIG. 1) to determine the angle of incidence of the ambient light source. In other embodiments, electronic device 10 may include at least two ambient light sensors 20, disposed on opposite surfaces of electronic device 10, that may be used to determine the angle of incidence of the ambient light. Further, in certain embodiments, electronic device 10 may detect multiple angles of incidence, for example, when there are two or more ambient light sources.

Method 412 may then continue by determining (block 256) the angular adjustment. For example, display controller 16 may use an angular adjustment profile 404, as described above with respect to FIG. 34, to determine the adjusted ambient light level. In certain embodiments, display controller 16 may calculate the adjusted ambient light level using the angular adjustment profile. For example, in certain embodiments, display controller 16 may calculate the adjusted ambient light level by multiplying the detected ambient light level by the cosine of the angle of incidence of the ambient light source. Further, in certain embodiments, display controller 16 may calculate the adjusted ambient light level for multiple light sources that have different angles of incidence. For example, in certain embodiments, display controller 16 may weight each of the light sources based on their corresponding ambient light level and/or angle of incidence. According to certain embodiments, display controller 16 may employ one or more algorithms to calculate the angular adjustment and/or the adjusted ambient light level. Further, in certain embodiments, the angular adjustment profile may be represented by one or more algorithms.

After determining the adjusted ambient light level, display controller 16 may then adjust (block 422) the brightness of display 12. For example, display controller 16 may use the adjusted ambient light level in conjunction with brightness adjustment profiles 62 (FIG. 4), 130 (FIGS. 8 and 17), or 300 (FIG. 26) to determine a brightness level for display 12. Display controller 16 may then vary the current or voltage supplied to backlight 14 to achieved the determined brightness level. Display controller 16 also may adjust the brightness of display 12 at a rate determined using method 346 as described above with respect to FIG. 30.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The invention claimed is:

1. An electronic device, comprising:

a display comprising a backlight;

a sensing device configured to detect an ambient light level and an angle of incidence value of ambient light; and a display controller operably coupled to the backlight and configured to:

determine an angular adjustment profile based upon the angle of incidence value; wherein the angular adjustment profile defines adjustments to the detected ambient light level based upon the angle of incidence;

determine an adjusted ambient light level by multiplying the ambient light level by the angular adjustment profile; and adjust a brightness of the backlight based on the adjusted ambient light level.

2. The electronic device of claim 1, wherein the sensing device comprises an ambient light sensor and the display controller is configured to determine the angular adjustment profile as the cosine of the angle of incidence value.

3. The electronic device of claim 1, wherein the sensing device comprises a camera.

4. The electronic device of claim 1, comprising a user interface configured to receive a user input that selects a particular angular adjustment profile for the backlight, wherein the particular angular adjustment profile specifies angular-based adjustments to the brightness based on the detected ambient light angle to simulate a reflectivity associated with hard copy material.

5. The electronic device of claim 1, comprising a user interface configured to receive a user input that selectively enables or disables adjustment of the brightness of the backlight based upon the angle of incidence of the ambient light.

6. An electronic device, comprising:

a display comprising a backlight;

one or more ambient light sensors configured to detect a level of ambient light and an angle of incidence value of the ambient light; and a display controller operably coupled to the backlight and configured to:

determine an angular adjustment profile based at least on the level of ambient light and a function of the angle of incidence value, wherein the angular adjustment profile defines adjustments to the detected ambient light level based upon the angle of incidence;

adjust the detected level of ambient light based on the angular adjustment profile to produce an adjusted ambient light level; and adjust a brightness of the backlight based on the adjusted ambient light level.

7. The electronic device of claim 6, wherein the adjusted ambient light level is approximately equal to the detected level of ambient light multiplied by the cosine of the angle of incidence.

8. The electronic device of claim 6, wherein the adjusted ambient light level is approximately equal to or greater than the detected level of ambient light multiplied by the cosine of the angle of incidence and less than the detected level of ambient light when the angle of incidence is greater than or less than ninety degrees.

9. The electronic device of claim 6, comprising a user interface configured to receive a user input that selectively enables or disables adjustment of the detected level of ambient light based on the angle of incidence.

10. A method, comprising:

detecting whether an angular adjustment function is selectively enabled via a user selection in a graphical user interface;

when the adjustment function is selectively enabled:

detecting, via a display controller, an ambient light level for an ambient light source;

detecting, via the display controller, an angle of incidence value of the ambient light from the ambient light source;

determining, via the display controller, an angular adjustment profile for the detected ambient light level based on the detected angle of incidence value; wherein the angular adjustment profile defines adjustments to the detected ambient light level based upon the angle of incidence; and adjusting, via the display controller, a brightness of a backlight based on the angular adjustment profile.

11. The method of claim 10, wherein determining an angular adjustment comprises determining an adjusted ambient light level approximately equal to the detected ambient light level multiplied by the cosine of the detected angle of incidence.

12. The method of claim 10, wherein determining an angular adjustment comprises determining an adjusted ambient light level approximately equal to or greater than the detected ambient light level multiplied by the cosine of the detected angle of incidence and approximately less than the detected ambient light level when the angle of incidence is greater than or less than ninety degrees.

13. The method of claim 10, comprising adjusting the detected ambient light level by the angular adjustment to produce an adjusted ambient light level, wherein adjusting a brightness of the backlight comprises determining a brightness level for the backlight that corresponds to the adjusted ambient light level.

14. The method of claim 10, wherein adjusting a brightness of the backlight comprises determining a brightness level for the backlight that corresponds to the detected ambient light level and applying the angular adjustment to the determined brightness level.

15. The method of claim 10, comprising verifying enablement of an angular adjustment for the backlight.

16. The method of claim 10, comprising:

detecting multiple ambient light levels each corresponding to a different ambient light source:

detecting multiple angles of incidence each corresponding to one of the different ambient light sources;

weighting the different ambient light sources based upon their corresponding detected ambient light levels and their corresponding detected angle of incidence; and calculating an angular adjustment profile based upon the weighted different ambient light sources; wherein the angular adjustment profile defines adjustments to the detected ambient light levels based upon the angles of incidence.

17. Non-transitory computer-readable storage media comprising instructions for:

determining an angular adjustment profile based at least on:

a level of ambient light detected by a sensor and a function of a value of the angle of incidence of the ambient light detected by the sensor, adjusting, using the angular adjustment profile, the detected ambient light level to produce an adjusted ambient light level that compensates for the angle of incidence of ambient light; and adjusting a brightness of a backlight based on the adjusted ambient light level.

18. The non-transitory computer-readable storage media of claim 17, comprising instructions for determining the adjusted ambient light level to be approximately equal to the detected ambient light level multiplied by the cosine of the angle of incidence of ambient light.

19. The non-transitory computer-readable storage media of claim 17, comprising instructions for determining the angular adjustment profile by determining the cosine of the angle of incidence of ambient light.

20. An electronic device, comprising:

a display comprising a backlight;

an ambient light sensor configured to detect an ambient light level for one or more ambient light sources; and a display controller operably coupled to the ambient light sensor and the backlight and configured to:

determine a particular angular adjustment profile for the backlight, wherein the angular adjustment profiles specifies angular-based adjustments to the brightness based on the detected ambient light angle to simulate a reflectivity associated with a hard copy material; and adjust a brightness of the backlight based on the detected ambient light level based upon the particular angular adjustment profile.

21. The electronic device of claim 20, wherein the display controller is configured to determine the particular angular adjustment profile for the backlight from a selection of a particular hard copy material profile provided in a graphical user interface.

22. The electronic device of claim 20, wherein the particular hard copy material profile comprises a book profile and the particular angular adjustment profile specifies angular-based adjustments to simulate a reflectivity associated with a book.

23. The electronic device of claim 20, wherein the particular hard copy material profile comprises a newspaper profile and the particular angular adjustment profile specifies angular-based adjustments to simulate a reflectivity associated with a newspaper.

24. The electronic device of claim 20, wherein the display controller is configured to:

detect whether an angular adjustment selection is selectively enabled; and adjust a brightness of the backlight based on the detected ambient light level based upon the particular angular adjustment profile only when the angular adjustment setting is selectively enabled.

* * * * *